(12) United States Patent
Murayama et al.

(10) Patent No.: US 9,176,882 B2
(45) Date of Patent: Nov. 3, 2015

(54) VIRTUAL TAPE DEVICE AND CONTROL METHOD OF VIRTUAL TAPE DEVICE

(71) Applicant: FUJITSU LIMITED, Kawasaki-shi, Kanagawa (JP)

(72) Inventors: Takashi Murayama, Nagano (JP); Fumio Matsuo, Nagano (JP); Katsuo Enohara, Kawaguchi (JP); Takaaki Yamato, Nagano (JP); Nobuyuki Hirashima, Nagano (JP); Tetsuya Kinoshita, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 159 days.

(21) Appl. No.: 13/748,898

(22) Filed: Jan. 24, 2013

(65) Prior Publication Data

US 2013/0205082 A1   Aug. 8, 2013

(30) Foreign Application Priority Data

Feb. 3, 2012   (JP) ................................. 2012-022543

(51) Int. Cl.
  *G06F 12/00*   (2006.01)
  *G06F 3/00*   (2006.01)
  *G06F 12/08*   (2006.01)
  *G06F 3/06*   (2006.01)

(52) U.S. Cl.
  CPC .......... *G06F 12/0866* (2013.01); *G06F 3/0601* (2013.01); *G06F 2212/213* (2013.01); *G06F 2212/224* (2013.01)

(58) Field of Classification Search
  None
  See application file for complete search history.

(56) References Cited

U.S. PATENT DOCUMENTS

| 2007/0033356 A1* | 2/2007 | Erlikhman ..................... 711/162 |
| 2008/0059736 A1* | 3/2008 | Murayama et al. ........... 711/162 |
| 2008/0077758 A1 | 3/2008 | Ohmido |
| 2011/0145494 A1* | 6/2011 | Mitsuma et al. .............. 711/111 |

FOREIGN PATENT DOCUMENTS

| JP | 2001-051901 | 2/2001 |
| JP | 2008-077519 | 4/2008 |
| JP | 2008-134682 | 6/2008 |
| JP | 2011-123834 | 6/2011 |

OTHER PUBLICATIONS

Japanese Office Action dated Aug. 18, 2015 in corresponding Japanese Patent Application No. 2012-022543, 4 pages.

* cited by examiner

*Primary Examiner* — Cheng-Yuan Tseng
*Assistant Examiner* — Craig Goldschmidt
(74) *Attorney, Agent, or Firm* — Staas & Halsey LLP

(57) ABSTRACT

A virtual tape device includes a storage unit, a cache determining unit, a selector, and a cache controller. The storage unit records logical volume information associated with an identifier of a logical volume, an updated time of the logical volume, information indicating whether the logical volume is allocated to a cache, an identifier of a physical volume storing data of the logical volume, and information indicating whether the physical volume are mounted in a physical tape drive. The cache determining unit determines, based on the logical volume information, whether the logical volume exists on the cache, when a request to store the logical volume on the cache is received and the cache does not have an available capacity. The selector selects the logical volume based on the determined result as an off-cache target logical volume. The selected logical volume is off-cached by the cache controller.

7 Claims, 22 Drawing Sheets

| LV IDENTIFIER | WRITING TIME | VALIDITY | PV IDENTIFIER | MOUNTING DATA | OFF-CACHE PRIORITY |
|---|---|---|---|---|---|
| A | OCTOBER 12, 2010, 12:54:38 | 0 | PV(A) | 1 | 0 |
| B | NOVEMBER 8, 2010, 03:45:10 | 0 | PV(B) | 0 | 0 |
| C | DECEMBER 10, 2010, 06:44:15 | 0 | PV(B) | 0 | 0 |
| A1 | MARCH 21, 2011, 01:10:20 | 0 | PV(A) | 1 | 0 |
| D | APRIL 18, 2011, 01:10:25 | 1 | PV(A) | 1 | 1 |
| E | APRIL 18, 2011, 01:10:26 | 1 | PV(A) | 1 | 2 |
| A2 | JULY 22, 2011, 18:38:19 | 1 | PV(A) | 1 | 3 |
| B1 | JULY 22, 2011, 20:42:54 | 1 | PV(A) | 1 | 4 |
| C1 | JULY 22, 2011, 23:11:40 | 1 | PV(A) | 1 | 5 |

| LV IDENTIFIER | MOUNTING TIME | UNMOUNTING TIME | NON-TARGET TIME PERIOD |
|---|---|---|---|
| A | AUGUST 22, 2011, 01:10:25 | APRIL 18, 2011, 01:10:25 | — |
| B | AUGUST 22, 2011, 01:10:26 | APRIL 18, 2011, 01:10:26 | — |
| C | AUGUST 22, 2011, 18:38:19 | AUGUST 22, 2011, 18:28:19 | 20 min |

FIG. 12

| REQUEST ID | REQUESTED LV IDENTIFIER | CACHED LV IDENTIFIERS | MOUNTED PV IDENTIFIER | STORED LV IDENTIFIERS | NUMBER OF RECALLS |
|---|---|---|---|---|---|
| 1 | N1 | B1, B2, A1, A2, A3, A4, A5, A6 | PV(A) | A1, A2, A3, A4, A5, A6 | 0 |
| 2 | N2 | B1, B2, A2, A3, A4, A5, A6, N1 | PV(A) | A1, A2, A3, A4, A5, A6 | 0 |
| 3 | A1 | B1, B2, A3, A4, A5, A6, N1, N2 | PV(A) | A1, A2, A3, A4, A5, A6, N1, N2 | 1 |
| 4 | A2 | B1, B2, A4, A5, A6, N1, N2, A1 | PV(A) | A1, A2, A3, A4, A5, A6, N1, N2 | 2 |
| 5 | A3 | B1, B2, A5, A6, N1, N2, A1, A2 | PV(A) | A1, A2, A3, A4, A5, A6, N1, N2 | 3 |
| 6 | A4 | B1, B2, A6, N1, N2, A1, A2, A3 | PV(A) | A1, A2, A3, A4, A5, A6, N1, N2 | 4 |

311

VIRTUAL TAPE DEVICE AND CONTROL METHOD OF VIRTUAL TAPE DEVICE

CROSS-REFERENCE TO RELATED APPLICATION

This application is based upon and claims the benefit of priority of the prior Japanese Patent Application No. 2012-022543, filed on Feb. 3, 2012, the entire contents of which are incorporated herein by reference.

FIELD

The embodiments discussed herein are related to a virtual tape device and a control method of a virtual tape device.

BACKGROUND

A virtual tape system includes a tape library and a virtual tape device. The tape library includes a physical volume (hereinafter referred to as PV) such as a magnetic tape for storing data. The virtual tape device includes a tape volume cache (TVC) and is arranged between a host and the tape library. The TVC is achieved by redundant arrays of inexpensive disks (RAID).

The virtual tape device stores data read from the PV included in the tape library on the TVC as a logical volume (hereinafter referred to as LV). In this manner, the virtual tape system stores the data of the LV on the TVC and reduces operations to be executed for a process of mounting the PV by the tape library and a process of un-mounting the PV by the tape library so as to reduce a time for access to data.

When the virtual tape device receives access to the LV from the host and the LV does not exist on the TVC, the virtual tape device executes a recall process of storing the LV offloaded from the TVC on the TVC. In this case, when the disk cache is full of data, the virtual tape device ensures a region in which a target LV is newly loaded on the disk cache.

For example, the virtual tape device sequentially offloads LVs from the TVC in order from an LV accessed at the earliest time among LVs stored on the TVC, and thereby generates an available region in the disk cache. Then, the virtual tape device allocates the generated available region to an LV that will be newly stored on the TVC.

The aforementioned conventional technique, however, has a problem that a time for the recall process may be long.

When an LV is to be recalled and a PV that stores the LV to be recalled is not mounted in a physical tape drive included in the tape library, the virtual tape device mounts, in the physical tape drive, the PV storing the LV to be recalled.

In order to mount the PV in the physical tape drive, the following process is executed by an operation of a robot in the tape library. First, the robot rewinds a currently mounted PV and unmounts the PV. Subsequently, the robot extracts the PV storing the LV to be recalled from a storage slot and mounts the extracted PV in any of physical tape drives. Then, the robot moves a tape head to a position at which the LV to be recalled has been written.

When a plurality of LVs to be recalled exist and are stored in different PVs, respectively, the robot operation that is the same as the aforementioned process is repeated in the tape library.

Japanese Laid-open Patent Publication No. 2011-123834 is an example of related art.

SUMMARY

According to an aspect of the embodiment, a virtual tape device includes a storage unit, a cache determining unit, a selector, and a cache controller. The storage unit records logical volume information associated with an identifier of a logical volume, an updated time of the logical volume, information indicating whether the logical volume is allocated to a cache or not, an identifier of a physical volume storing data of the logical volume, and information indicating whether the physical volume are mounted in a physical tape drive or not. The cache determining unit determines, based on the logical volume information, whether the logical volume exists on the cache or not, when a request to store the logical volume on the cache is received and the cache does not have an available capacity, the logical volume being updated and stored in the physical volume mounted in the physical tape drive and being allocated to the cache. The selector selects the logical volume based on the result of the determination made by the cache determining unit as an off-cache target logical volume to be off-cached from the cache. And a cache controller that off-caches the off-cache target logical volume selected from the cache by the selector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a logical volume information table according to the first embodiment;

FIG. 8 is a diagram illustrating an example of information stored in a non-target time period table according to the second embodiment;

FIG. 12 is a diagram illustrating information stored in an off-cache priority logic table according to the third embodiment;

DESCRIPTION OF EMBODIMENTS

Hereinafter, embodiments of a virtual tape device disclosed herein and a method disclosed herein for controlling a virtual tape device are described in detail with reference to the accompanying drawings. The virtual tape device disclosed herein and the method disclosed herein, however, are not limited to the embodiments. At least two of the embodiments may be combined without contradicting details of processes.

First Embodiment

The first embodiment describes a virtual tape system 10 that includes a virtual tape device 40. The configuration of the virtual tape system 10, process operations to be executed by the virtual tape device 40, procedures for processes to be executed by the virtual tape device 40, and the like are described below with reference to FIGS. 1 to 6.

(Configuration of Virtual Tape System According to First Embodiment)

Figure 1:
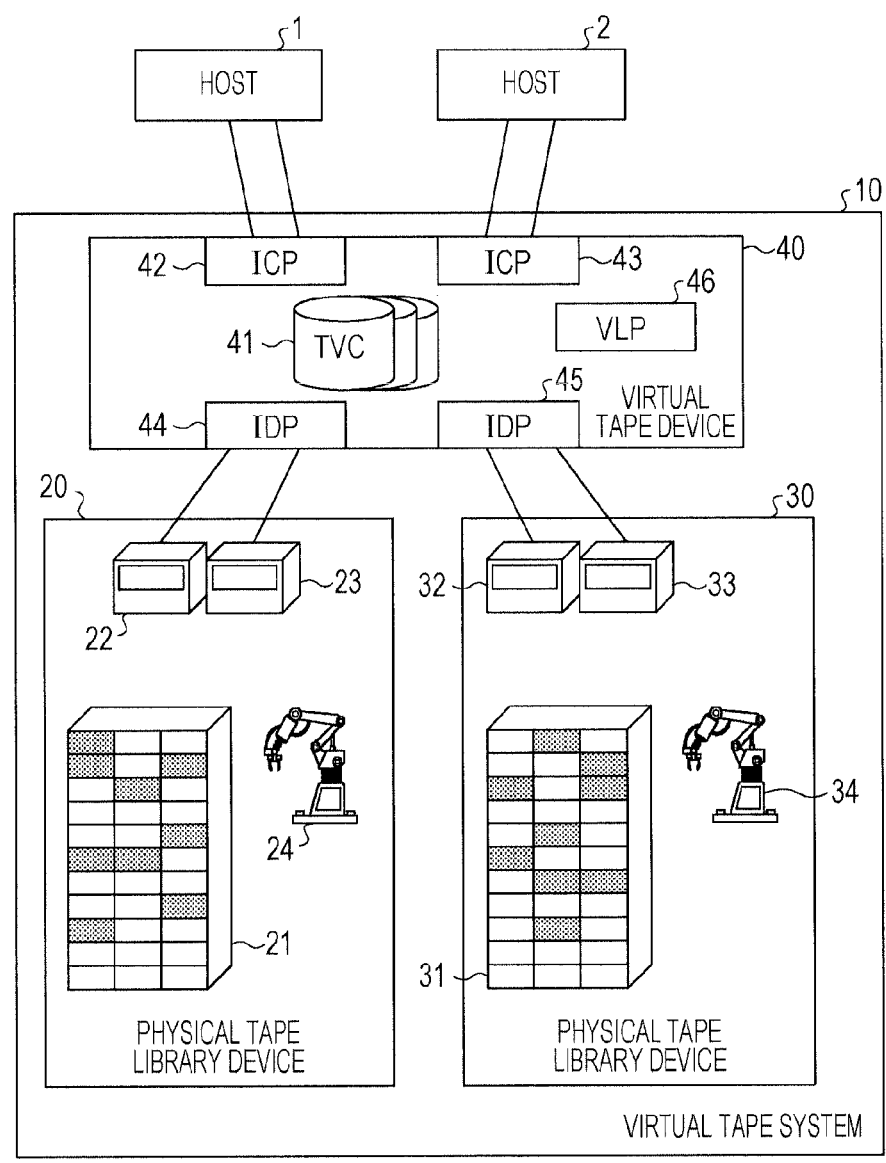
FIG. 1 is a diagram illustrating an example of the configuration of a virtual tape system according to a first embodiment.

The configuration of the virtual tape system 10 according to the first embodiment is described with reference to FIG. 1. FIG. 1 is a diagram illustrating an example of the configuration of the virtual tape system 10 according to the first embodiment. As illustrated in FIG. 1, the virtual tape system 10 according to the first embodiment includes a physical tape library device 20, a physical tape library device 30 and the virtual tape device 40.

In the virtual tape system 10, the virtual tape device 40 is connected to the physical tape library devices 20 and 30. The number of physical tape library devices is not limited to the number of the physical tape library devices illustrated in FIG. 1 and may be changed. As illustrated in FIG. 1, the virtual tape device 40 is connected to hosts 1 and 2 in the virtual tape system 10. The number of hosts is not limited to the number of the hosts illustrated in FIG. 1 and may be changed.

The hosts 1 and 2 are main frames, for example. Each of the hosts 1 and 2 requests the virtual tape device 40 to mount a logical volume (hereinafter referred to as LV). Each of the hosts 1 and 2 requests the virtual tape device 40 to read the mounted LV and write the LV. Each of the hosts 1 and 2 requests the virtual tape device 40 to un-mount the LV.

The physical tape library device 20 includes physical tape drives 22, 23, a slot 21 for storing physical tapes, and a robot 24 for moving a physical tape. The number of slots included in the physical tape library device 20, the number of physical tape drives included in the physical tape library device 20 and the number of robots included in the physical tape library device 20 are not limited to the numbers illustrated in FIG. 1 and may be changed.

The slot 21 stores physical tapes. For example, the physical tapes are magnetic tapes such as linear tape open (LTO) cartridges. In the following description, the physical tapes are described as physical volumes (hereinafter referred to as PVs).

The physical tape drives 22 and 23 write data to set PVs and read data stored by moving the set PVs. The robot 24 extracts a PV stored in the slot 21 and sets the extracted PV in the physical tape drive 22 or 23.

The physical tape library device 30 includes physical tape drives 32, 33, a slot 31 for storing physical tapes, and a robot 34 for moving a physical tape. The slot 31 is equivalent to the slot 21. The physical tape drives 32 and 33 are equivalent to the physical tape drives 22 and 23. The robot 34 is equivalent to the robot 24.

The virtual tape device 40 includes a tape volume cache (TVC) 41, integrated channel processors (ICPs) 42, 43, integrated device processors (IDPs) 44, 45 and a virtual library processor (VLP) 46. The number of TVCs included in the virtual tape device 40, the number of ICPs included in the virtual tape device 40, the number of IDPs included in the virtual tape device 40 and the number of VLPs included in the virtual tape device 40 is not limited to the numbers illustrated in FIG. 1.

The TVC 41 includes RAID (Redundant Arrays of Inexpensive Disks) storage and a file system and stores a plurality of LVs.

The ICP 42 includes a central processing unit (CPU) and a main storage device. The ICP 42 includes a channel interface card and is connected to the host 1 through a storage connection interface such as FCLINK (registered trademark) or OCLINK (registered trademark).

The ICP 42 receives a request to mount an LV from the host 1. If the requested LV exists on the TVC 41, the ICP 42 notifies the host 1 of completion of mounting. If the requested LV does not exist on the TVC 41, the ICP 42 requests the VLP 46 (described later) to read the LV from the physical tape library device 20 or 30.

The ICP 42 receives, from the host 1, a request to read an LV stored on the TVC 41 and a request to write an LV to the TVC 41. When the LV requested by the host 1 is completely written and the ICP 42 receives a request to un-mount the LV after the writing of the LV, the ICP 42 requests the VLP 46 to write the LV to the physical tape library device 20 or 30.

The ICP 43 includes a CPU and a main storage device. The ICP 43 includes a channel interface card and is connected to the host 2 through a storage connection interface such as FCLINK (registered trademark) or OCLINK (registered trademark).

The ICP 43 receives a request to mount an LV from the host 2. If the requested LV exists on the TVC 41, the ICP 43 notifies the host 2 of completion of mounting. If the requested LV does not exist on the TVC 41, the ICP 43 requests the VLP 46 (described later) to read the LV from the physical tape library device 20 or 30.

The ICP 43 receives, from the host 2, a request to read an LV stored on the TVC 41 and a request to write an LV to the TVC 41. When the LV requested by the host 2 is completely written and the ICP 43 receives a request to un-mount the LV after the writing of the LV, the ICP 43 requests the VLP 46 to write the LV to the physical tape library device 20 or 30.

The IDP 44 includes a CPU and a main storage device. The IDP 44 has data paths for the physical tape drives 22 and 23 of the physical tape library device 20. When the IDP 44 receives a process of mounting a PV or a process of un-mounting a PV from the VLP 46, the IDP 44 controls the robot 24 and causes the robot 24 to execute the process of mounting the PV or the process of un-mounting the PV.

When the IDP 44 receives, from the VLP 46, a process of reading an LV from a mounted PV, the IDP 44 controls the physical tape drive 22 or 23 and causes the physical tape drive 22 or 23 to read the LV from the PV. Then, the IDP 44 writes the read LV to the TVC 41. In other words, the IDP 44 causes the LV to be stored on the TVC 41. When the IDP 44 receives, from the VLP 46, a process of writing an LV to a mounted PV, the IDP 44 controls the physical tape drive 22 or 23 and causes the physical tape drive 22 or 23 to write the LV to the PV.

The IDP 45 includes a CPU and a main storage device. The IDP 45 has data paths for the physical tape drives 32 and 33 of the physical tape library device 30. When the IDP 45 receives, from the VLP 46, a process of mounting a PV or a process of un-mounting a PV, the IDP 45 controls the robot 34 and causes the robot 34 to execute the process of mounting the PV or the process of un-mounting the PV.

When the IDP 45 receives, from the VLP 46, a process of reading an LV from a mounted PV, the IDP 45 controls the physical tape drive 32 or 33 and causes the physical tape drive 32 or 33 to read the LV from the PV. Then, the IDP 45 writes the read LV to the TVC 41. In other words, the IDP 45 causes the LV to be stored on the TVC 41. When the IDP 45 receives, from the VLP 46, a process of writing an LV to a mounted PV, the IDP 45 controls the physical tape drive 32 or 33 and causes the physical tape drive 32 or 33 to write the LV to the PV.

The VLP 46 includes a CPU and a main storage device. When the VLP 46 receives, from the ICP 42 or 43, a request to read an LV from the physical tape library device 20 or 30, the VLP 46 executes the following process. That is, the VLP 46 requests the IDP 44 or 45 to execute the process of mounting a PV and a process of reading the LV from the mounted PV.

When the VLP 46 receives from the ICP 42 or 43, a request to write an LV to the physical tape library device 20 or 30, the VLP 46 executes the following process. That is, the VLP 46 requests the IDP 44 or 45 to execute the process of mounting a PV, the process of writing the LV to the mounted PV and the process of un-mounting the PV.

The VLP 46 includes a logical volume information table 111 in a storage unit 110. The logical volume information table 111 stores the identifiers of LVs, times when the LVs have been updated, information indicating whether or not at least a part of the TVC 41 is allocated to the LVs, the identifiers of PVs storing the LVs, and information indicating whether or not each of the PVs is mounted in any of the physical tape drives, while the identifier of an LV, a time when the LV has been updated, information indicating whether or not a part of the TVC 41 is allocated to the LV, the identifier of a PV storing the LV, and information indicating whether or not the PV is mounted, which are included in each of rows of the logical volume information table 111, are associated with each other. When the VLP 46 receives a request to store an LV on the TVC 41, and the TVC 41 does not have an available capacity, the VLP 46 executes the following process. That is, the VLP 46 determines, on the basis of the logical volume information table 111, whether or not an LV that has been updated and stored in a PV mounted in any of the physical tape drives and to which a part of the TVC 41 is allocated exists. Then, the VLP 46 selects, on the basis of the result of the determination, an LV as an off-cache target LV to be offloaded from the TVC 41. Then, the VLP 46 offloads the selected off-cache target LV from the TVC 46.

Even when a request to recall an LV is provided, the VLP 46 of the virtual tape device 40 increases the probability that the LV to be recalled exists in a PV that is currently used. As a result, the virtual tape device 40 can reduce a time for the recall process.

(Functional Configuration of VLP According to First Embodiment)

Figure 2:
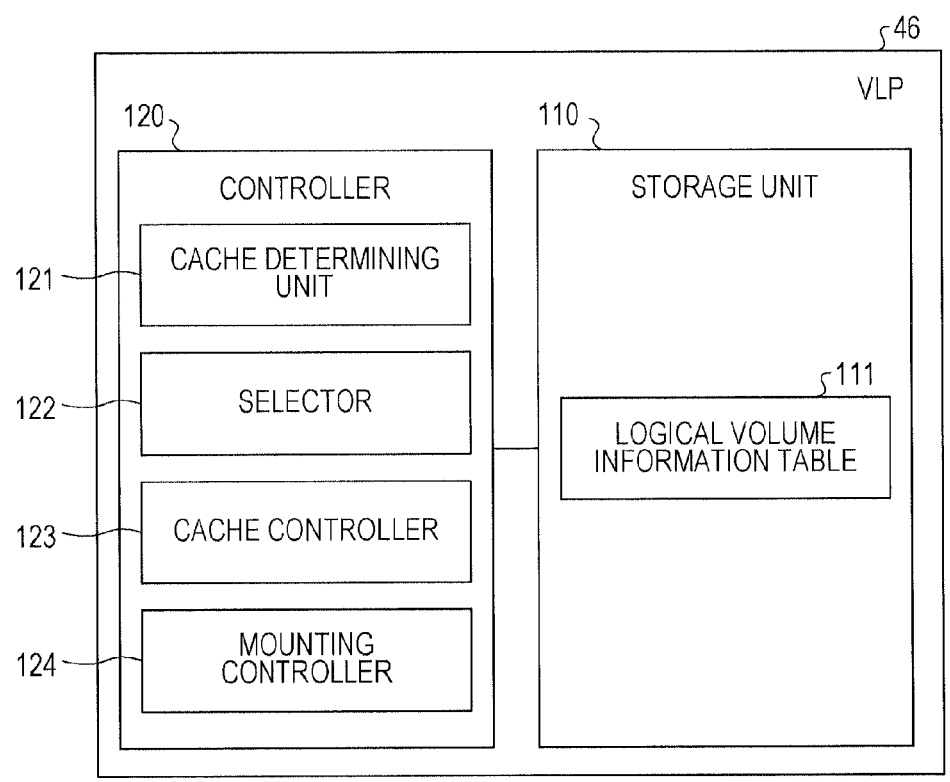
FIG. 2 is a functional block diagram illustrating an example of a functional configuration of a VLP according to the first embodiment.

Next, a functional configuration of the VLP 46 according to the first embodiment is described with reference to FIG. 2. FIG. 2 is a functional block diagram illustrating an example of the functional configuration of the VLP 46. The VLP 46 according to the first embodiment includes the storage unit 110 and a controller 120.

The storage unit 110 is a storage device such as a semiconductor memory element and includes the logical volume information table 111. The logical volume information table 111 stores information in which the identifier of an LV, a time when the LV has been updated, information indicating whether or not the LV exists on the TVC 41, the identifier of a PV storing data as the LV, and information indicating whether or not the PV is mounted in any of the physical tapes drives are associated with each other.

The information that is stored in the logical volume information table 111 is described with reference to FIG. 3. FIG. 3 is a diagram illustrating an example of the information stored in the logical volume information table 111 according to the first embodiment. For example, the logical volume information table 111 stores "LV identifiers", "writing times", "validity", "PV identifiers", "mounting data" and "off-cache priorities", while an "LV identifier", a "writing time", "validity", a "PV identifier", "mounting data" and an "off-cache priority", which are described in each of rows of the logical volume information table 111, are associated with each other.

The "LV identifiers" stored in the logical volume information table 111 indicate the identifiers of LVs. For example, "A", "B" and the like are stored in an item for the "LV identifiers". In the following description, an LV that is identified by "A" is represented by an LV (A), for example.

The "writing times" stored in the logical volume information table 111 indicate times when the LVs have been last updated. For example, "Oct. 12, 2010, 12:54:38", "Jul. 22, 2011, 20:42:54" and the like are stored in an item for the "writing times" as the years, dates and times.

The "validity" stored in the logical volume information table 111 indicates whether or not the LVs are stored on the TVC 41. For example, "1" that indicates that a corresponding LV is stored on the TVC 41, "0" that indicates that a corresponding LV is not stored on the TVC 41, and like are stored in an item for the "validity".

The "PV identifiers" stored in the logical volume information table 111 indicate the identifiers of PVs storing data of the LVs. For example, "PV (A)", "PV (B)" and the like are stored in an item for the "PV identifiers".

The "mounting data" stored in the logical volume information table 111 indicates whether or not each of the PVs is mounted in any of the physical tape drives. For example, "1" that indicates that a corresponding PV is mounted in any of the physical tape drives, "0" that indicates that a corresponding PV is not mounted in any of the physical tape drives, and the like are stored in an item for the "mounting data".

The "off-cache priorities" stored in the logical volume information table 111 indicate priorities of LVs that will be offloaded from the TVC 41. For example, "1", "2" and the like are stored in an item for the "off-cache priorities". For LVs that are not stored on the TVC 41, "0" that indicates that the LVs are not targets for off-cache priorities is stored in the item for the "off-cache priorities".

FIG. 3 illustrates an example in which an LV that is identified by "A" has been last updated at "12 o'clock 54 minutes 38 seconds on Oct. 12, 2010" and is not stored on the TVC 41. In the example, the LV identified by "A" is stored in a PV identified by "PV (A)" and the PV (A) is mounted. Since the LV identified by "A" has an off-cache priority "0", the LV identified by "A" is not a target for the off-cache priorities.

In the example illustrated in FIG. 3, an LV that is identified by "A2" has been last updated at "18 o'clock 38 minutes 19 seconds on Jul. 22, 2011" and is stored on the TVC 41. In the example, the LV identified by "A2" is stored in the PV identified by "PV (A)" and the PV (A) is mounted. An off-cache priority of the LV identified by "A2" is "3".

Returning to FIG. 2, the controller 120 is an electronic circuit such as a CPU or a micro processing unit (MPU) and includes a cache determining unit 121, a selector 122, a cache controller 123 and a mounting controller 124.

When the cache determining unit 121 receives a request to store an LV on the TVC 41 from the host 1 or 2, the cache determining unit 121 determines the requested LV exists on the TVC 41. If the cache determining unit 121 determines that the requested LV exists on the TVC 41, the cache determining unit 121 terminates a process.

If the cache determining unit 121 determines that the requested LV does not exist on the TVC 41, the cache determining unit 121 determines whether or not the TVC 41 has an available capacity. If the cache determining unit 121 determines that the TVC 41 has an available capacity, the cache determining unit 121 causes the mounting controller 124 to determine whether or not a PV storing the requested LV is mounted in any of the physical tape drives.

If the cache determining unit 121 determines that the TVC 41 does not have an available capacity, the cache determining unit 121 executes the following process. That is, the cache determining unit 121 determines whether or not an LV that has been updated and stored in a PV mounted in any of the physical tape drives exists on the TVC 41.

In the example illustrated in FIG. 3, the cache determining unit 121 determines that LVs "D, E, A2, B1 and C1" exist as LVs that have been updated and stored in the PV (A) mounted in any of the physical tape drives and exist on the TVC 41. Then, the cache determining unit 121 outputs the results of the determination to the selector 122.

If the cache determining unit 121 determines that an LV that has been updated and stored in a PV mounted in any of the physical tape drives and to which a part of the TVC 41 is allocated exists, the selector 122 executes the following process. That is, the selector 122 selects the LV as an off-cache target LV that will be offloaded from the TVC 41. In the following description, a logic in which the selector 122 selects, as an off-cache target LV, an LV that has been updated and stored in a PV mounted in any of the physical tape drives and exists on the TVC 41 is referred to as "intra-PV LV off-cache priority logic".

If the cache determining unit 121 determines that a plurality of LVs that have been updated and stored in the same PV mounted in any of the physical tape drives and to which at least a part of the TVC 41 is allocated exist, the selector 122 executes the following process. That is, the selector 122 references the logical volume information table 111 and selects, as an off-cache target LV from among the plurality of LVs, an LV that has been updated at the earliest time.

In the example illustrated in FIG. 3, the selector 122 selects, as an off-cache target LV, the LV "D" that has been updated at the earliest time from among the LVs identified by "D, E, A2, B1 and C1".

If the cache determining unit 121 determines that an LV that has been updated and stored in a PV mounted in any of the physical tape drives does not exist on the TVC 41, the selector 122 executes the following process. That is, the selector 122 selects, as an off-cache target LV, an LV that has been updated at the earliest time among LVs that exist on the TVC 41.

The cache controller 123 requests the IDP 44 or 45 to read an LV requested by the host 1 or 2 and load the read LV onto the TVC 41. The cache controller 123 requests the IDP 44 or 45 to offload an off-cache target LV selected by the selector 122 from the TVC 41.

The mounting controller 124 determines whether or not a PV storing the requested LV is mounted in any of the physical tape drives. If the mounting controller 124 determines that the PV storing the requested LV is not mounted in any of the physical tape drives, the mounting controller 124 requests the IDP 44 or 45 to mount the PV storing the requested LV in any of the physical tape drives.

If the mounting controller 124 determines that the PV storing the requested LV is mounted in any of the physical tape drives, or after the PV storing the requested LV is completely mounted in any of the physical tape drives, the mounting controller 124 executes the following process. That is, the mounting controller 124 reads the LV requested by the host 1 or 2 and loads the read LV onto the TVC 41.

In addition, the mounting controller 124 requests the IDP 44 or 45 to write an LV updated on the TVC 41 to a PV. If the PV does not have an available capacity, the mounting controller 124 requests the IDP 44 or 45 to mount a new PV. Specifically, the mounting controller 124 un-mounts the PV having no available capacity and requests the IDP 44 or 45 to mount the new PV.

(Procedures for Process by Virtual Tape Device According to First Embodiment)

Figure 4:
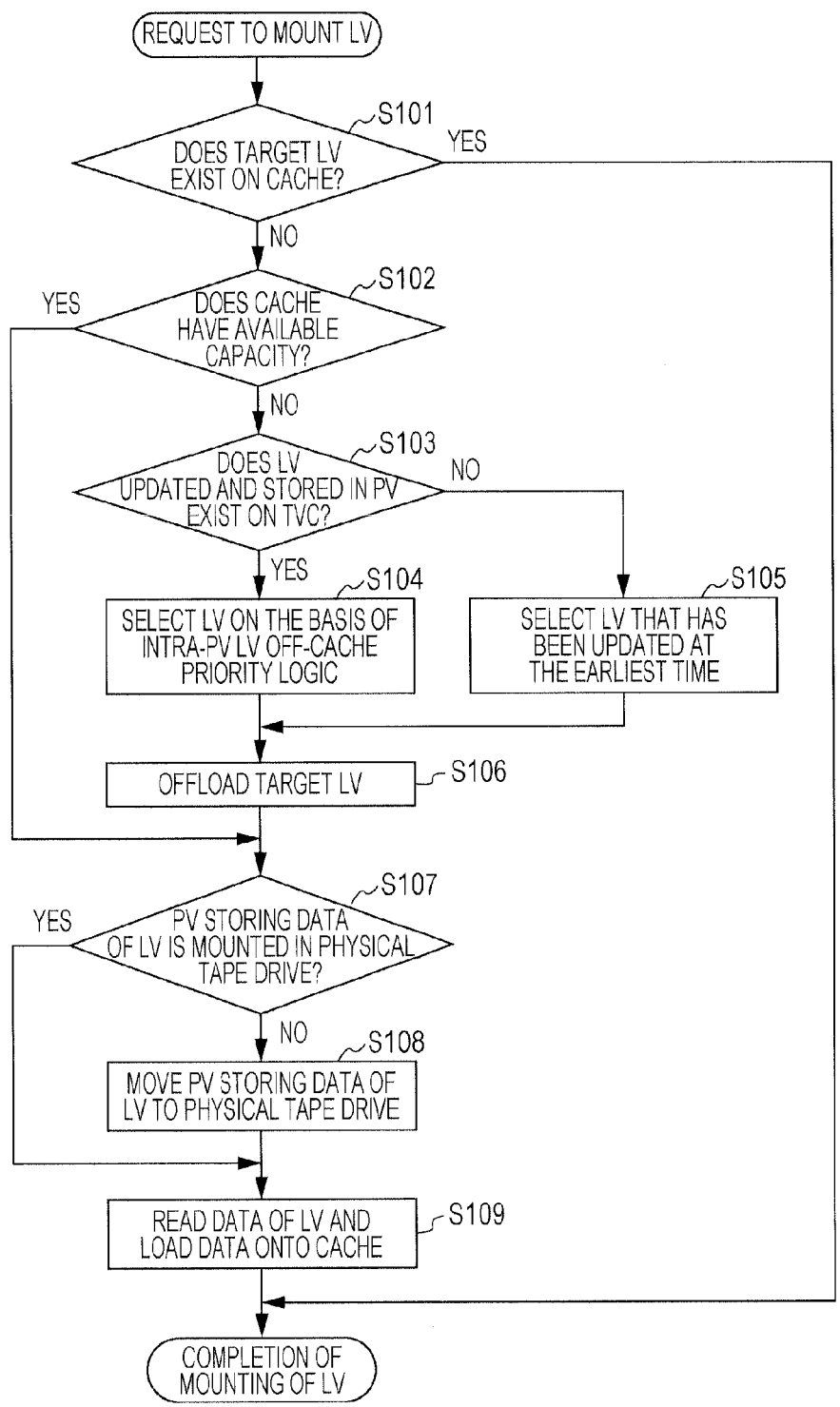
FIG. 4 is a method of procedures for a process that is executed by a virtual tape device according to the first embodiment.

Next, procedures for a process that is executed by the virtual tape device 40 according to the first embodiment are described with reference to FIG. 4. FIG. 4 is a method of the procedures for the process that is executed by the virtual tape device 40 according to the first embodiment. When the virtual tape device 40 receives, from the host 1 or 2, a request to mount an LV or read the LV, the virtual tape device 40 executes the following process.

The cache determining unit 121 determines whether or not the requested LV exists on the TVC 41 (in step S101). If the cache determining unit 121 determines that the requested LV exists on the TVC 41 (Yes in step S101), the cache determining unit 121 terminates the process.

If the cache determining unit 121 determines that the requested LV does not exist on the TVC 41 (No in step S101), the cache determining unit 121 determines whether or not the TVC 41 has an available capacity (in step S102). If the cache determining unit 121 determines that the TVC 41 has an available capacity (Yes in step S102), the process proceeds to step S107.

If the cache determining unit 121 determines that the TVC 41 has no available capacity (No in step S102), the cache determining unit 121 executes the following process. That is, the cache determining unit 121 determines, on the basis of the logical volume information table 111, whether or not an LV that has been updated and stored in a PV mounted in any of the physical tape drives exists on the TVC 41 (in step S103).

If the cache determining unit 121 determines that the LV that has been updated and stored in the PV mounted in any of the physical tape drives exists on the TVC 41 (Yes in step S103), the selector 122 executes the following process. That is, the selector 122 selects, on the basis of the intra-PV LV off-cache priority logic, the LV as an off-cache target LV that will be offloaded from the TVC 41 (in step S104).

If the cache determining unit 121 determines that the LV that has been updated and stored in the PV mounted in any of the physical tape drives does not exist on the TVC 41 (No in step S103), the selector 122 executes the following process. That is, the selector 122 selects, as an off-cache target LV, an LV that has been updated at the earliest time among LVs that exist on the TVC 41 (in step S105).

After the process of step S104 or S105 is terminated, the cache controller 123 offloads the off-cache target LV selected by the selector 122 from the TVC 41 (in step S106).

The mounting controller 124 determines whether or not a PV storing the requested LV is mounted in any of the physical tape drives (in step S107). If the mounting controller 124 determines that the PV storing the requested LV is not mounted in any of the physical tape drives (No in step S107), the mounting controller 124 causes the PV storing the requested LV to be mounted in any of the physical tape drives (in step S108).

If the mounting controller 124 determines that the PV storing the requested LV is mounted in any of the physical tape drives (Yes in step S107), the process proceeds to step S109.

The cache controller 123 reads the LV and loads the read LV onto the TVC 41 (in step S109). After the process of step S109 is terminated, the virtual tape device 40 terminates the process illustrated in FIG. 4.

(Effects of First Embodiment)

As described above, the virtual tape device 40 according to the first embodiment prioritizes an LV of which the last updated data currently exists in a PV mounted in any of the physical tape drives. Then, the virtual tape device 40 treats the prioritized LV as an off-cache target LV. Thus, even when a request to recall an LV is provided, the virtual tape device 40 according to the first embodiment increases the probability that data of the LV to be recalled exists in a PV that is currently used.

Figure 5:
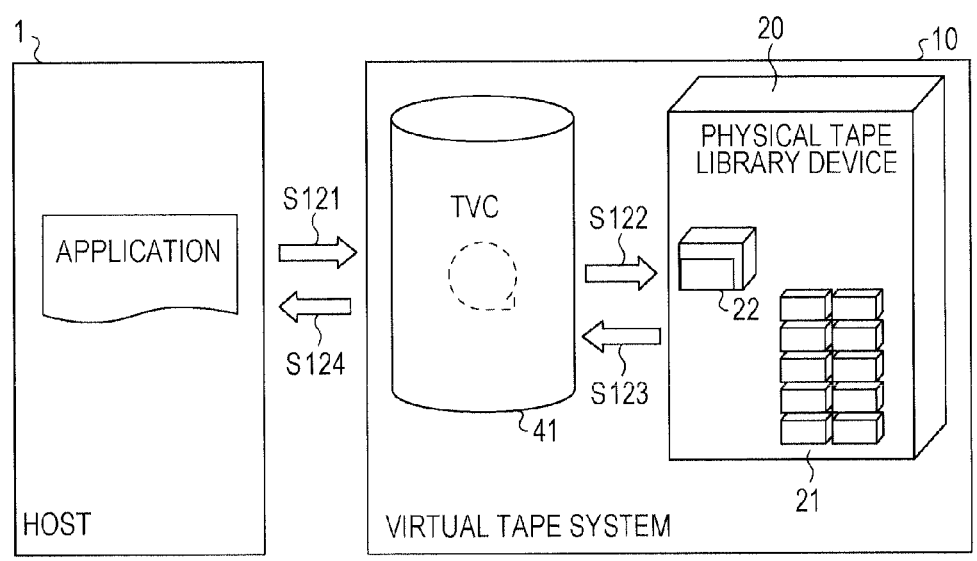
FIG. 5 is a diagram illustrating an example in which a recall time is reduced by the virtual tape device according to the first embodiment.

Next, effects that are obtained when the virtual tape device 40 increases the probability that data of an LV to be recalled exists in a PV that is currently used are described with reference to FIG. 5. FIG. 5 is a diagram illustrating an example in which a recall time is reduced by the virtual tape device 40 according to the first embodiment. FIG. 5 illustrates the example in which the virtual tape system 10 receives a request to mount an LV from the host 1.

In the virtual tape system 10, the virtual tape device 40 receives the request to mount the LV from the host 1 (in step S121). Then, the virtual tape device 40 requests a recall of the LV (in step S122). In this example, in the virtual tape system 10, the probability that the LV to be recalled exists in a PV that is currently used is high. Thus, the PV storing the LV to be recalled is not extracted from the slot 21.

Thus, the virtual tape device 40 stores, from the currently used PV, the LV to be recalled on the TVC 41 (in step S123).

Then, the host 1 reads the LV from the virtual tape device 40 (in step S124). In this manner, the virtual tape device 40 according to the first embodiment can reduce the recall time.

LVs of which the last updated data exists in PVs mounted in the physical tape drives are LVs that have been relatively recently used. If the LVs are offloaded from the TVC 41, data may be frequently replaced in the TVC 41 and the total recall time may increase.

Figure 6A:
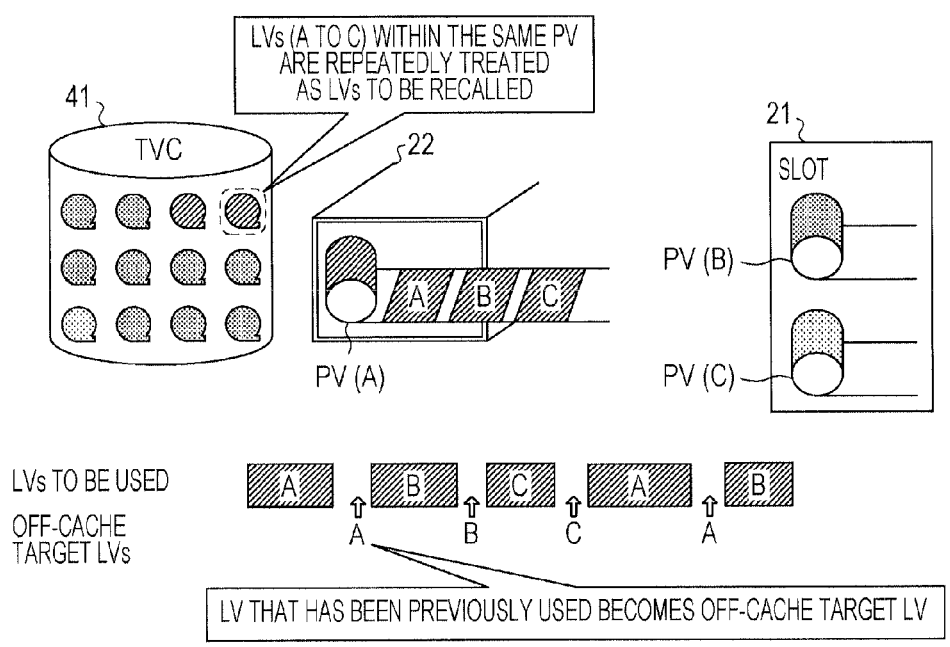
FIG. 6A is a diagram illustrating an example in which data is frequently replaced in a cache.

Examples in which data is frequently replaced in the TVC 41 are described with reference to FIGS. 6A and 6B. FIG. 6A is a diagram illustrating one of the examples in which data is frequently replaced in the TVC 41, while FIG. 6B is a diagram illustrating the other example in which data is frequently replaced in the TVC 41.

In the example illustrated in FIG. 6A, a PV (B) and a PV (C) are stored in the slot 21 and the PV(A) is mounted in the physical tape drive 22. In the example illustrated in FIG. 6A, the LV (A), the LV (B) and the LV (C) are stored from the PV (A) onto the TVC 41 in the order of the LV (A), the LV (B) and the LV (C) and used.

As illustrated in FIG. 6A, in order to cache the LV (B), the LV (A) is offloaded from the TVC 41. In order to cache the LV (C), the LV (B) is offloaded from the TVC 41. In this manner, an LV that has been previously used becomes an off-cache target LV.

Figure 6B:
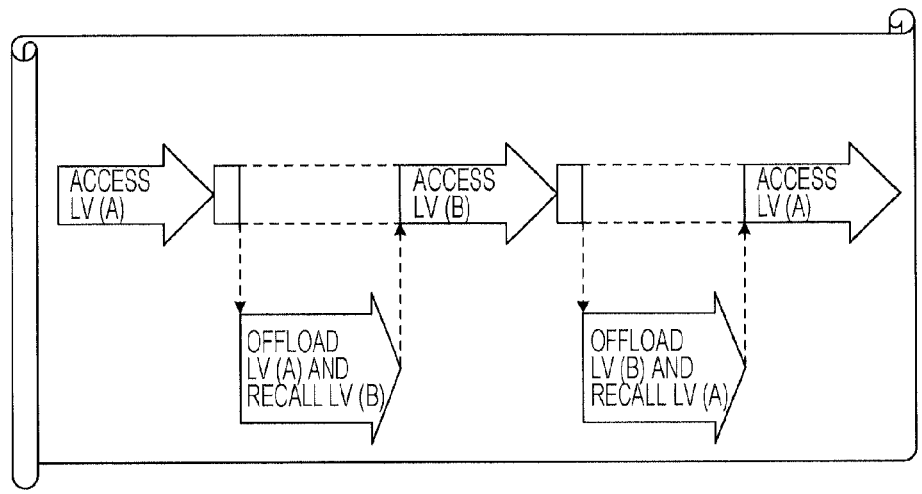
FIG. 6B is a diagram illustrating another example in which data is frequently replaced in the cache.

FIG. 6B illustrates the example in which the TVC 41 is full of data and the LV (A) and the LV (B) that exist in a PV are alternately accessed. As illustrated in FIG. 6B, in order to access the LV (B) after the LV (A) is accessed, the LV (A) is offloaded from the TVC 41. In order to access the LV (A) after the LV (B) is accessed, the LV (B) is offloaded from the TVC 41. In this manner, the LVs that have been previously used may alternately become off-cache target LVs. In this case, data is frequently replaced in the TVC 41.

On the other hand, if a plurality of LVs of which the last updated data exist in the same PV exist on the TVC 41, the virtual tape device 40 according to the first embodiment treats the LVs as LVs to be offloaded from the TVC 41 in order from an LV of which a time stamp is oldest. Thus, the virtual tape device 40 according to the first embodiment increases the probability that an LV that is not currently used is offloaded from the TVC 41. In addition, the virtual tape device 40 according to the first embodiment reduces the rate of occurrence of a recall. Thus, the virtual tape device 40 according to the first embodiment can inhibit data from being frequently replaced in the TVC 41.

Second Embodiment

If an LV that has been previously used has been read and un-mounted without being updated, or if only an LV that has been previously accessed exists in a PV, a frequently-used LV may be treated as an off-cache target LV in the virtual tape device 40. As a result, the frequently-used LV may be recalled in many cases in the virtual tape device 40.

Thus, the virtual tape device 40 may not select a frequently-used LV as an off-cache target LV for a predetermined time period. The second embodiment describes an example in which a non-target time period in which an LV selected on the basis of the intra-PV LV off-cache priority logic is prohibited to be offloaded from the TVC 41 is provided for the virtual tape device 40. The second embodiment describes an example in which the virtual tape device 40 suppresses occurrences of many recalls of frequently-used LVs.

(Configuration of Virtual Tape System According to Second Embodiment)

The configuration of the virtual tape system according to the second embodiment is the same as the configuration of the virtual tape system according to the first embodiment, except for a part of the functional configuration of the VLP 46. In the second embodiment, the VLP 46 according to the first embodiment is replaced with a VLP 46a.

(Functional Configuration of VLP According to Second Embodiment)

Figure 7:
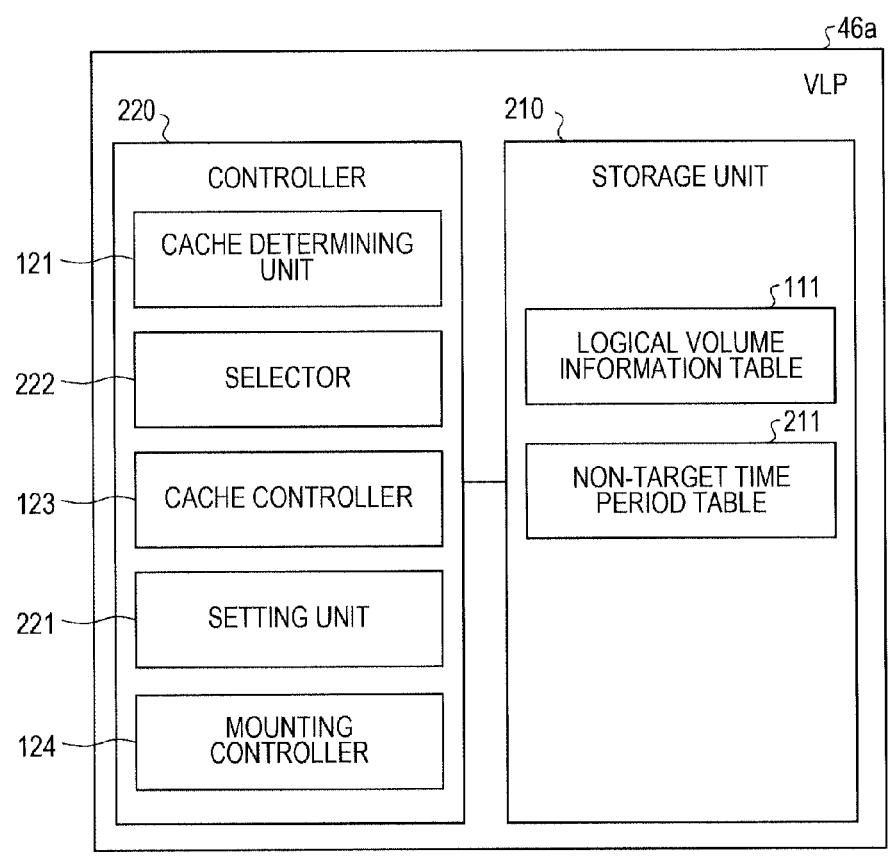
FIG. 7 is a functional block diagram illustrating an example of a functional configuration of a VLP according to a second embodiment.

Next, a functional configuration of the VLP 46a according to the second embodiment is described with reference to FIG. 7. FIG. 7 is a functional block diagram illustrating the functional configuration of the VLP 46a according to the second embodiment. The VLP 46a according to the second embodiment includes a storage unit 210 and a controller 220. Functional parts that are illustrated in FIG. 7 and play the same roles as the parts illustrated in FIG. 2 are indicated by the same reference numerals, and a detailed description thereof is omitted.

The storage unit 210 is a storage device such as a semiconductor memory element and includes the logical volume information table 111 and a non-target time period table 211. The non-target time period table 211 stores a non-target time period in which an LV selected on the basis of the intra-PV LV off-cache priority logic is prohibited to be offloaded from the TVC 41.

Information that is stored in the non-target time period table 211 is described with reference to FIG. 8. FIG. 8 is a diagram illustrating an example of the information stored in the non-target time period table 211. As illustrated in FIG. 8, the non-target time table 211 stores "LV identifiers", "mounting times", "unmounting times" and the "non-target time period", which are associated with each other.

The "LV identifiers" stored in the non-target time period table 211 indicate the identifiers of LVs. For example, "A", "B" and the like are stored in an item for the "LV identifiers".

The "mounting times" stored in the non-target time period table 211 indicate times when the LVs have been mounted on the TVC 41. In other words, the "mounting times" indicate the times when the LVs have started to be used. For example, "Aug. 22, 2011, 01:10:25", "Aug. 22, 2011, 01:10:26" and the like are stored in an item for the "mounting times".

The "un-mounting times" stored in the non-target time period table 211 indicate times when the LVs have been un-mounted from the TVC 41. In other words, the un-mounting times" indicate the times when the use of the LVs has been ended. For example, "Apr. 18, 2011, 01:10:25", "Apr. 18, 2011, 01:10:26" and the like are stored in an item for the "un-mounting times".

The "non-target time period" stored in the non-target time period table 211 indicates the non-target time period in which the LV selected on the basis of the intra-PV LV off-cache priority logic is prohibited to be offloaded from the TVC 41. For example, "20 min" or the like is stored in an item for the "non-target time period". If a "non-target time period" is not set, "—" is stored in the item for the "non-target time period".

In the example illustrated in FIG. 8, the LV identified by "A" has been mounted at "1 o'clock 10 minutes 25 seconds on Aug. 22, 2011" after having been un-mounted at "1 o'clock 10 minutes 25 on Apr. 18, 2011". In this example, a "non-target time period" is not set for the LV identified by "A".

In the example illustrated in FIG. 8, the LV identified by "C" has been mounted at "18 o'clock 38 minutes 19 seconds on Aug. 22, 2011" after having been un-mounted at "18 o'clock 28 minutes 19 seconds on Aug. 22, 2011". In this example, the "non-target time period" of "20 min" is set for the LV identified by "C".

Returning to FIG. 7, the controller 220 is an electronic circuit such as a CPU or an MPU and includes the cache determining unit 121, a selector 222, the cache controller 123, a setting unit 221 and the mounting controller 124.

Figure 9:
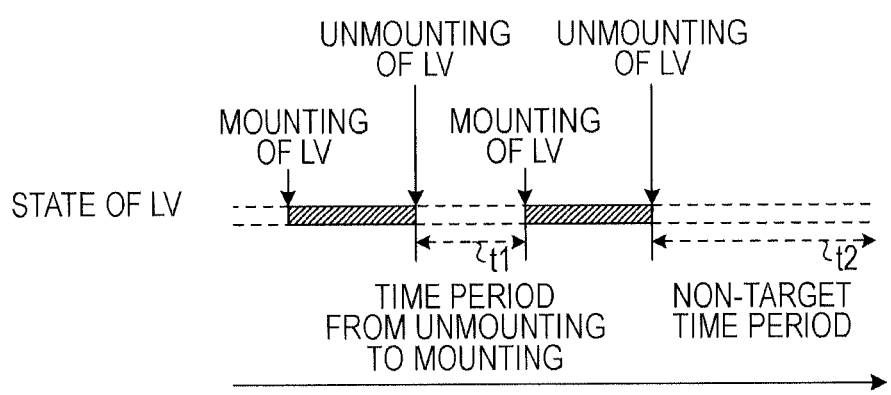
FIG. 9 is a diagram illustrating an example of a non-target time period in which an LV selected on the basis of an intra-PV LV off-cache priority logic is prohibited to be offloaded from the cache.

The setting unit 221 sets a predetermined non-target time period in which an LV selected on the basis of the intra-PV LV off-cache priority logic is prohibited to be offloaded from the TVC 41. The non-target time period in which the LV selected on the basis of the intra-PV LV off-cache priority logic is prohibited to be offloaded from the TVC 41 is described with reference to FIG. 9. FIG. 9 is a diagram illustrating an example of the non-target time period in which the LV selected on the basis of the intra-PV LV off-cache priority logic is prohibited to be offloaded from the TVC 41.

As illustrated in FIG. 9, the setting unit 221 records a time period t1 from un-mounting of an LV to the latest mounting of the LV. Then, the setting unit 221 sets a time period t2 that is twice as long as the time period t1 in the item for the "non-target time period" in the non-target time period table 211 as a non-target time period in which the interested LV selected on the basis of the intra-PV LV off-cache priority logic is prohibited to be offloaded from the TVC 41. For example, when the time period from the un-mounting of the target LV to the latest mounting of the target LV is 10 minutes, the setting unit 221 sets a time period of 20 minutes from the un-mounting as the non-target time period in which the LV selected on the basis of the intra-PV LV off-cache priority logic is prohibited to be offloaded from the TVC 41. The "non-target time period" is not limited to the time period that is twice as long as the time period t1. For example, the non-target time period" may be a time period that is three times as long as the time period t1. The non-target time period" may be a time period obtained by adding a predetermined time period to the time period t1.

If time periods from mounting of an LV to un-mounting of the LV are not equal, the setting unit 221 may calculate the average of the time periods and set the calculated average as the non-target time period. For an LV that is almost not used, a time period from un-mounting of the LV to mounting of the LV is very long. Thus, the setting unit 221 may set, to 24 hours (1 day), the maximum value of the non-target time period in which the LV selected on the basis of the intra-PV LV off-cache priority logic is prohibited to be offloaded from the TVC 41, for example.

The selector 222 has the functions of the selector 122 according to the first embodiment and the following function. That is, the selector 222 determines whether or not an off-cache target LV selected on the basis of the "intra-PV LV off-cache priority logic" is prohibited to be offloaded for a non-target time period. In the example illustrated in FIG. 8, if the off-cache target LV is the LV (C), the selector 222 determines whether or not a time of 20 minutes has elapsed after un-mounting of the LV (C).

If the off-cache target LV is not prohibited to be offloaded, the selector 222 selects the LV as the off-cache target LV. On the other hand, if the off-cache target LV is prohibited to be offloaded for the non-target time period, the selector 222 selects, as the off-cache target LV, an LV that has been updated at the earliest time among LVs that exist on the TVC 41.

(Procedures for Process by Virtual Tape Device According to Second Embodiment)

Figure 10:
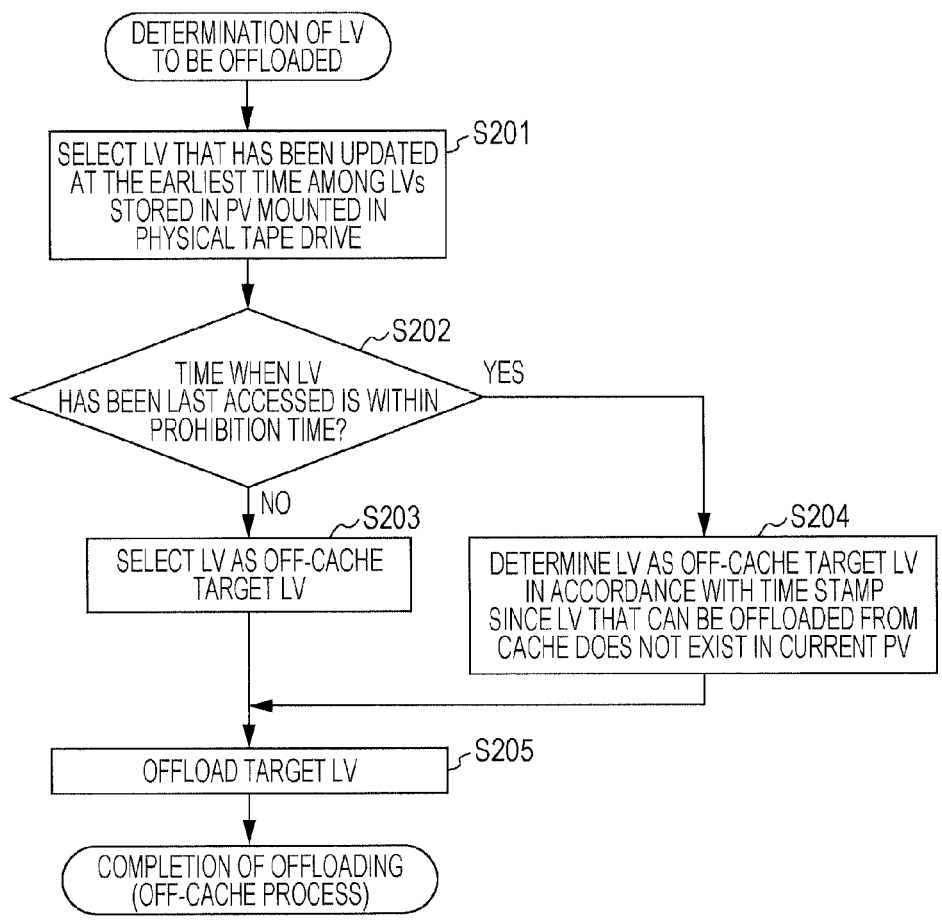
FIG. 10 is a method of procedures of a process that is executed by the virtual tape device according to the second embodiment.

Next, procedures for a process that is executed by the virtual tape device 40 according to the second embodiment are described with reference to FIG. 10. FIG. 10 is a method of the procedures for the process that is executed by the virtual tape device 40 according to the second embodiment. When the virtual tape device 40 receives a request to mount an LV from the host 1 or 2, the virtual tape device 40 executes the following process. Only processes that are different from the processes of steps S104 to S106 included in the process that is illustrated in FIG. 4 and executed by the virtual tape device 40 according to the first embodiment are described below.

The selector 222 selects, as an off-cache target LV on the basis of the intra-PV LV cache priority logic, the LV that has been updated and stored in a PV mounted in any of the physical tape drives and exists on the TVC 41 (in step S201). In this case, if a plurality of off-cache target LVs exist on the TVC 41, the selector 222 selects, as an off-cache target TV, an LV that has been updated at the earliest time. Subsequently, the selector 222 determines whether or not the selected LV is prohibited to be offloaded from the TVC 41 for a predetermined non-target time period (in step S202).

If the selector 222 determines that the selected LV is not prohibited to be offloaded (No in step S202), the selector 222 selects the interested LV as the off-cache target LV (in step S203).

If the selector 222 determines that the selected LV is prohibited to be offloaded for the predetermined non-target time period (Yes in step S202), the selector 222 executes the following process. That is, the selector 222 selects, as the off-cache target LV, an LV that has been updated at the earliest time among LVs that exist in the TVC 41 (in step S204).

Subsequently, the cache controller 123 offloads the off-cache target LV from the TVC 41 (in step S205) After the process of step S205 is terminated, the virtual tape device 40 terminates the process illustrated in FIG. 10.

(Effects of Second Embodiment)

As described above, since a non-target time period in which an LV selected on the basis of the intra-PV LV off-cache priority logic is prohibited to be offloaded from the TVC 41 is provided for the virtual tape device 40 according to the second embodiment, the virtual tape device 40 according to the second embodiment can suppress occurrences of many recalls of a frequently-used LV.

If an LV that has been updated at the earliest time among a plurality of off-cache target LVs is prohibited to be offloaded for a non-target time period, the virtual tape device 40 according to the second embodiment may select, from among the plurality of LVs, an LV that is not prohibited to be offloaded.

Third Embodiment

If an LV is selected on the basis of the intra-PV LV off-cache priority logic and offloaded, an LV that is not stored in a PV mounted in any of the physical tape drives and is cached on the TVC 41 may not be used in the virtual tape device 40.

If an LV selected on the basis of the intra-PV LV cache priority logic and offloaded from the TVC 41 is frequently recalled, it may be effective to offload, from the TV, an LV that is currently stored on the TVC 41 and is among LVs of which data is not stored in a PV that is currently used.

The third embodiment describes a case where if an LV that is selected on the basis of the intra-PV LV off-cache priority logic and offloaded is frequently recalled, the virtual tape device 40 offloads an LV that exists on the TVC 41 and is not used.

(Configuration of Virtual Tape System According to Third Embodiment)

The configuration of the virtual tape system 10 according to the third embodiment is the same as the configurations of the virtual tape system according to the first and second embodiments, except for a part of the functional configuration of the VLP 46. In the third embodiment, the VLP 46 according to the first embodiment is replaced with a VLP 46b.

(Functional Configuration of VLP According to Third Embodiment)

Figure 11:
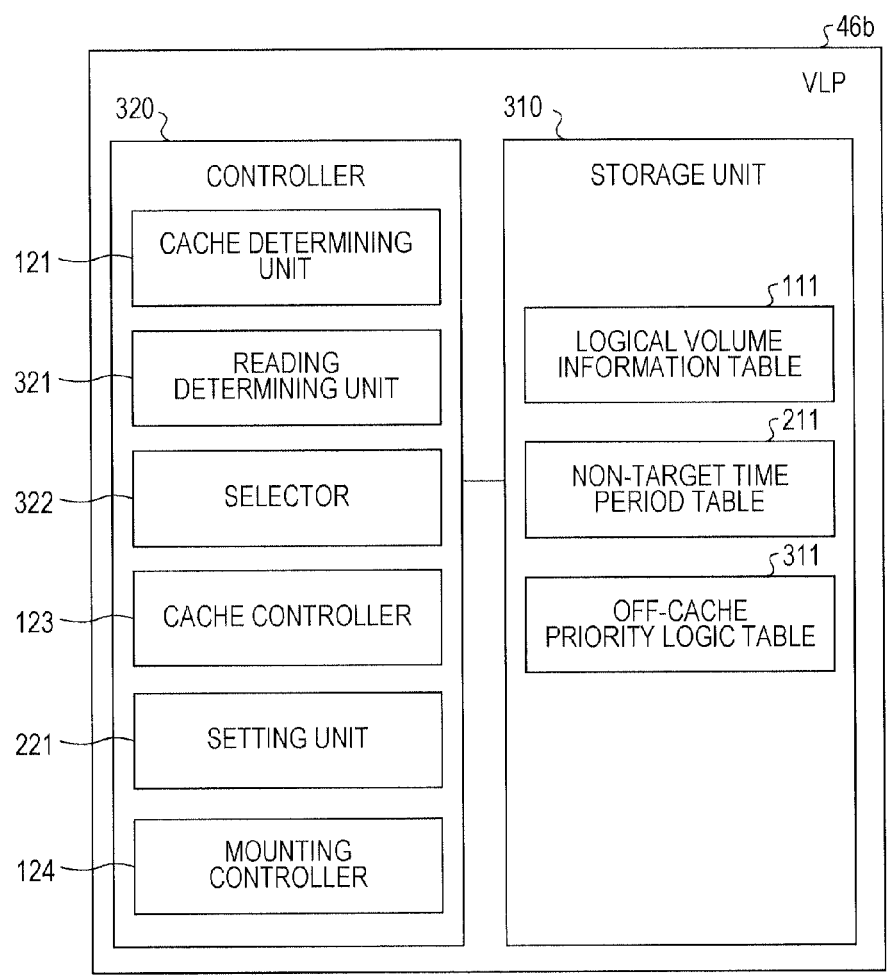
FIG. 11 is a functional block diagram illustrating an example of a functional configuration of an LVP according to a third embodiment.

Next, a functional configuration of the VLP 46b according to the third embodiment is described with reference to FIG. 11. FIG. 11 is a functional block diagram illustrating the functional configuration of the VLP 46b. The VLP 46b according to the third embodiment includes a storage unit 310 and a controller 320. Functional parts that are illustrated in FIG. 11 and play the same roles as the parts illustrated in FIG. 2 or 7 are indicated by the same reference numerals, and a detailed description thereof is omitted.

The storage unit 310 is a storage device such as a semiconductor memory element and includes the logical volume information table 111, the non-target time period table 211 and an off-cache priority logic table 311.

Information that is stored in the off-cache priority logic table 311 is described with reference to FIG. 12. FIG. 12 is a diagram illustrating an example of the information stored in the off-cache priority logic table 311 according to the third embodiment. For example, the off-cache priority logic table 311 stores "request IDs", "requested LV identifiers", "cached LV identifiers", a "mounted PV identifier", "stored LV identifiers" and the "number of recalls" as illustrated in FIG. 12, while a "request ID, a "requested LV identifier", a "cached LV identifier", a "mounted PV identifier", a "stored LV identifier" and the "number of recalls", which are included in each of rows of the off-cache priority logic table 311, are associated with each other.

The "requested IDs" stored in the off-cache priority logic table 311 indicate the order that the host 1 or 2 provides requests to mount LVs. For example, "1" that indicates that a request to mount an LV is first provided, "2" that indicates that a request to mount an LV is provided second, and the like are stored in an item for the "request IDs".

The "requested LV identifiers" stored in the off-cache priority logic table 311 indicate the identifiers of LVs that have been requested by the host 1 or 2 to be mounted. For example, "N1", "A1" and the like are stored in an item for the "requested LV identifiers".

The "cached LV identifiers" stored in the off-cache priority logic table 311 indicate the identifiers of LVs that exist on the TVC 41. For example, "B1", "A1" and the like are stored in an item for the "cached LV identifiers". The example illustrated in FIG. 12 assumes that, in the off-cache priority logic table 311, the identifiers of the LVs are stored in order from an LV of which a time stamp is oldest to an LV of which a time stamp is newest or in order from the LV described on the leftmost side of the item for the "cached LV identifiers" to the LV described on the rightmost side of the item for the "cached LV identifiers".

The "mounted PV identifier" stored in the off-cache priority logic table 311 indicates the identifier of a PV mounted in any of the physical tape drives. For example, "PV (A)" or the like is stored in an item for the "mounted PV identifier".

The "stored LV identifiers" stored in the off-cache priority logic table 311 indicate the identifiers of LVs stored in the PV mounted in the physical tape drive. For example, "A1", "A2" and the like are stored in an item for the "stored LV identifiers".

The "number of recalls" that is stored in the off-cache priority logic table 311 indicates the number of times when an off-cache target LV selected on the basis of the intra-PV LV cache priority logic has been recalled after having been offloaded from the TVC 41. For example, "1", "2" and the like are stored in an item for the "number of recalls". For example, an LV "A1" is requested using a request ID "3" illustrated in FIG. 12. The LV "A1" has been offloaded from the TVC 41 due to the request ID "1". Thus, "1" is stored in a field, corresponding to the request ID "3", of the item for the "number of recalls".

As an example, FIG. 12 indicates that an LV that has been first requested to be cached is an LV identified by "N1", and LVs identified by "B1, B2, A1, A2, A3, A4, A5 and A6" exist on the TVC 41. In addition, FIG. 12 indicates that the PV (A) is mounted and LVs identified by "A1, A2, A3, A4, A5 and A6" are stored in the PV (A).

FIG. 12 indicates that an LV that has been requested second to be cached is an LV identified by "N2" and LVs identified by "B1, B2, A2, A3, A4, A5, A6 and N1" exist on the TVC 41. In addition, FIG. 12 indicates that the PV (A) is mounted and LVs identified by "A1, A2, A3, A4, A5, A6 and N1" are stored in the PV (A). FIG. 12 indicates that the LV identified by "A1" has been offloaded from the TVC 41 in order to cache the LV identified by "N1" and first requested to be cached.

Returning to FIG. 11, the controller 320 is an electronic circuit such as a CPU or an MPU and includes the cache determining unit 121, a reading determining unit 321, a selector 322, the cache controller 123, the setting unit 221 and the mounting controller 124.

The reading determining unit 321 determines whether or not an LV has been read onto the TVC 41 from a PV predetermined times while the PV is not un-mounted from a physical tape drive. For example, the reading determining unit 321 references the off-cache priority logic table 311 and determines whether or not an LV selected on the "intra-PV LV off-cache priority logic" has been recalled more than the predetermined times after having been offloaded from the TVC 41.

The example illustrated in FIG. 12 describes that the number of the predetermines times is set to 3. If a request ID indicates "5", the number of recalls is 3 and the reading determining unit 321 determines that the LV has not been recalled more than the predetermined times. If the request ID indicates "6", the number of recalls is 4 and the reading determining unit 321 determines that the LV has been recalled more than the predetermined times. Then, the reading determining unit 321 outputs the result of the determination to the selector 322.

The selector 322 has the functions of the selector 222 according to the second embodiment and the following function. For example, if the reading determining unit 321 determines that an LV has been read onto the TVC 41 from a PV the predetermined times while the PV is not un-mounted from a physical tape drive, the selector 322 executes the following process. That is, the selector 322 selects, as an off-cache target LV, an LV that has been updated at the earliest time among LVs that exist on the TVC 41. In the example illustrated in FIG. 12, if the request ID indicates "6", the selector 322 selects, as the off-cache target LV, an LV "B1" of which a time stamp is oldest among LVs described in the item for the "cached LV identifiers".

If the reading determining unit 321 determines that the LV has not been read onto the TVC 41 from the PV the predetermined times while the PV is not un-mounted from a physical tape drive, the selector 322 executes the following process. That is, the selector 322 determines whether or not an LV selected as an off-cache target LV on the basis of the intra-PV LV off-cache priority logic is prohibited to be offloaded from the TVC 41 for a predetermined prohibition time period.

Procedures for Process by Virtual Tape Device According to Third Embodiment

Figure 13:
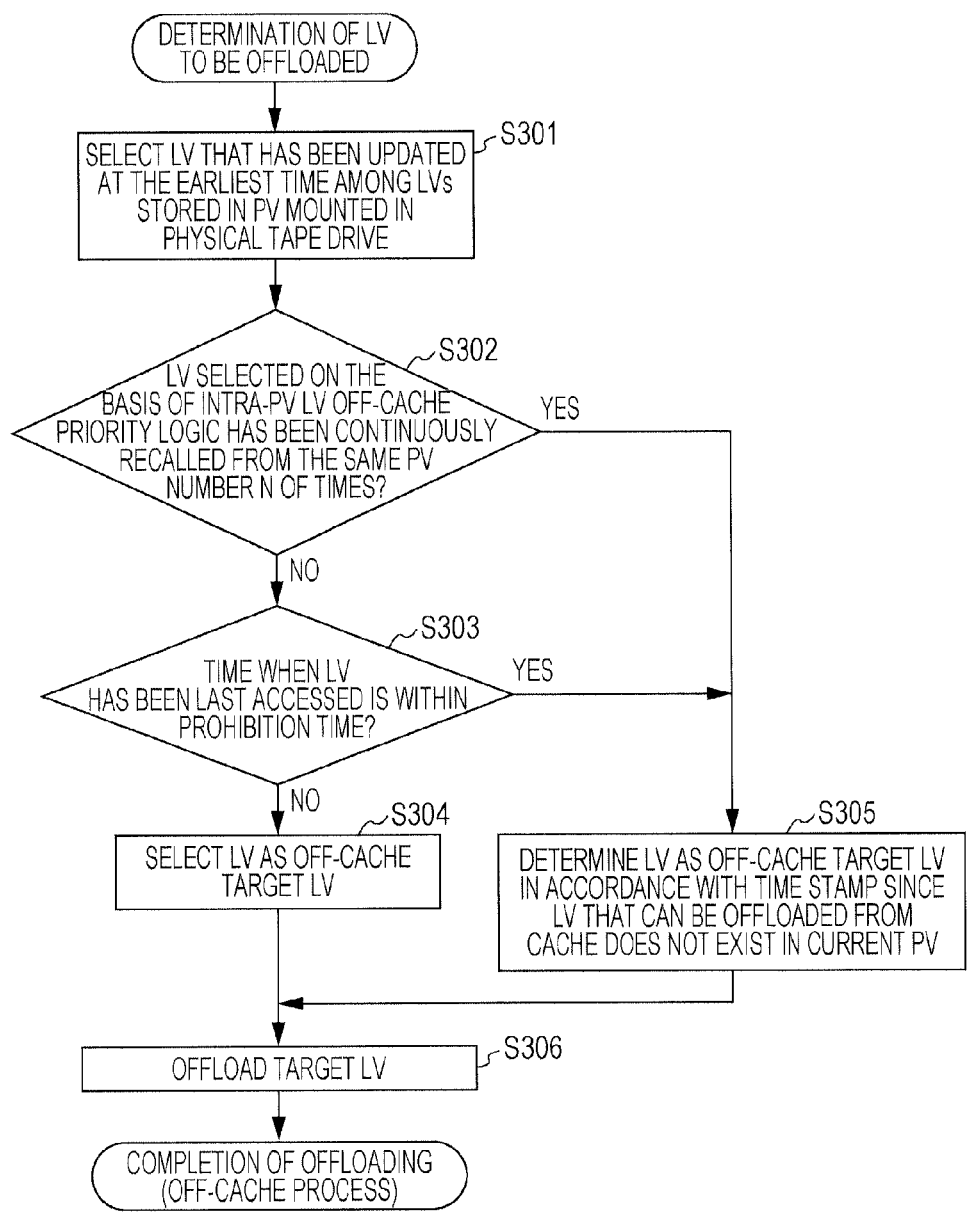
FIG. 13 is a method of procedures for a process that is executed by the virtual tape device according to the third embodiment.

Next, the procedures for the process that is executed by the virtual tape device 40 according to the third embodiment are described with reference to FIG. 13. FIG. 13 is a method of the procedures for the process that is executed by the virtual tape device 40 according to the third embodiment. When receiving a request to mount an LV from the host 1 or 2, the virtual tape device 40 executes the following process. Only processes that are different from the processes of steps S201 to S204 included in the process that is illustrated in FIG. 10 and executed by the virtual tape device 40 according to the second embodiment are described below.

The selector 322 selects, on the basis of the intra-PV LV cache priority logic as an off-cache target LV to be offloaded from the TVC 41, an LV that has been updated and stored in a PV mounted in any of the physical tape drives and exists on the TVC 41 (in step S301).

Subsequently, the reading determining unit 321 determines whether or not the LV selected on the basis of the intra-PV LV cache priority logic has been continuously recalled from the same PV a number N of times (in step S302). If the reading determining unit 321 determines that the LV selected on the basis of the intra-PV LV cache priority logic has been continuously recalled from the same PV the number N of times (Yes in step S302), the process proceeds to step S305.

If the reading determining unit 321 determines that the LV selected on the basis of the intra-PV LV cache priority logic has not been continuously recalled from the same PV the number N of times (No in step S302), the selector 322 executes the following process. That is, the selector 322 determines whether or not the selected off-cache target LV is prohibited to be offloaded from the TVC 41 for the predetermined prohibition time period (in step S303).

If the selector 322 determines that the selected off-cache target LV is not prohibited to be offloaded from the TVC 41 (No in step S303), the selector 322 the LV as the off-cache target LV (in step S304).

If the selector 322 determines that the selected off-cache target LV is prohibited to be offloaded from the TVC 41 for the predetermined prohibition time period (Yes in step S303), the process proceeds to step S305. Specifically, the selector 322 selects, as the off-cache target LV, an LV that has been updated at the earliest time among LVs that exist on the TVC 41 (in step S305).

Subsequently, the cache controller 123 offloads the off-cache target LV from the TVC 41 (in step S306). After the process of step S306 is terminated, the virtual tape device 40 terminates the process illustrated in FIG. 13.

(Effect of Third Embodiment)

As described above, the virtual tape device 40 according to the third embodiment can effectively use the disk cache.

Fourth Embodiment

When a PV is full of data, the PV may be switched to another PV in the virtual tape system 10. In this case, the superiority of the recall performance based on the "intra-PV LV off-cache priority logic" in the virtual tape device 40 may be lost. In other words, it may take some time for the virtual tape device 40 to recall an LV.

Thus, before a PV becomes full of data, the virtual tape device 40 may store, on the TVC 41 in advance, an LV that is to be used and among LVs stored in mounted PVs. The fourth embodiment describes a case where before a PV becomes full of data, the virtual tape device 40 requests the host 1 or 2 to provide information of an LV to be used and stores the LV to be used on the TVC 41.

(Configuration of Virtual Tape System According to Fourth Embodiment)

The configuration of the virtual tape system 10 according to the fourth embodiment is the same as the configuration of the virtual tape system 10 according to the first embodiment, except for a part of the functional configuration of the VLP 46. In the fourth embodiment, the VLP 46 according to the first embodiment is replaced with a VLP 46c.

(Functional Configuration of VLP According to Fourth Embodiment)

Figure 14:
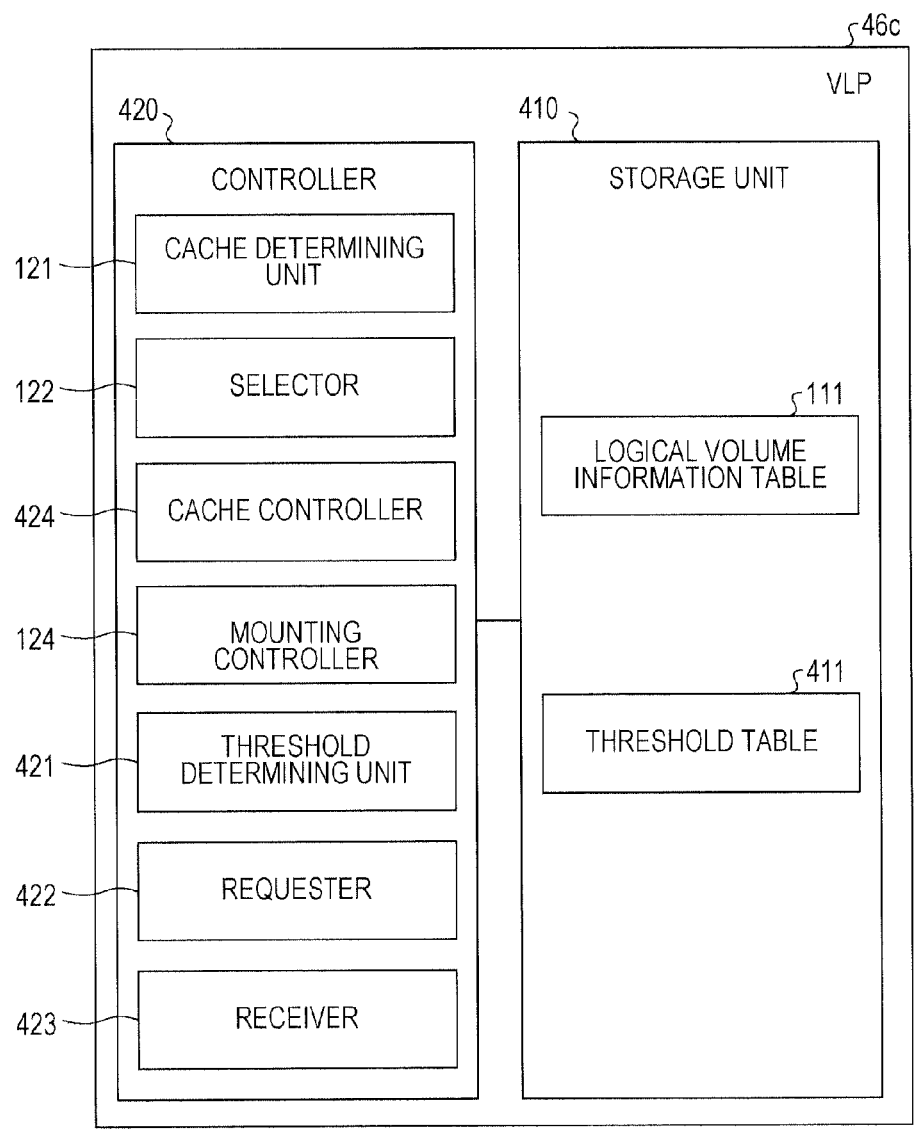
FIG. 14 is a functional block diagram illustrating an example of a functional configuration of a VLP according to a fourth embodiment.

Next, a functional configuration of the VLP 46c according to the fourth embodiment is described with reference to FIG. 14. FIG. 14 is a functional block diagram illustrating the functional configuration of the VLP 46c according to the fourth embodiment. The VLP 46c according to the fourth embodiment includes a storage unit 410 and a controller 420. Functional parts that are illustrated in FIG. 14 and play the same roles as the parts illustrated in FIG. 2 are indicated by the same reference numerals, and a detailed description thereof is omitted.

The storage unit 410 is a storage device such as a semiconductor memory element and includes the logical volume information table 111 and a threshold table 411.

The threshold table 411 stores the amount of data that is stored in a PV mounted in a physical tape drive and is determined to be almost full of the data. In other words, the threshold table 411 stores a value that indicates that an available capacity of the PV is lower than a predetermined threshold. For example, "80%" is stored in the threshold table 411. This value is an example and can be changed.

Returning to FIG. 14, the controller 420 is an electronic circuit such as a CPU or an MPU, for example, and includes the cache determining unit 121, the selector 122, the mounting controller 124, a threshold determining unit 421, a requester 422, a receiver 423 and a cache controller 424.

The threshold determining unit 421 determines whether or not an available capacity of a PV mounted in any of the physical tape drives is lower than the predetermined threshold. For example, the threshold determining unit 421 reads the amount of data stored in a PV mounted in a current physical tape drive and determines whether or not the read amount of the data stored in the PV exceeds the threshold stored in the threshold table 411.

For example, if the read amount of the data stored in the PV exceeds the threshold stored in the threshold table 411, the threshold determining unit 421 determines that the available capacity of the PV is lower than the predetermined threshold. Then, the threshold determining unit 421 notifies the requester 422 that the available capacity of the PV is lower than the predetermined threshold.

If the threshold determining unit 421 determines that the available capacity of the PV is lower than the predetermined threshold, the requester 422 requests the host 1 or 2 to transmit, to the virtual tape device 40, on-cache information that indicates an LV that is among LVs stored in the PV and will be stored on the TVC 41. The on-cache information includes the identifier of the LV to be cached.

When the PV mounted on the physical tape drive is un-mounted, the requester 422 requests the host 1 or 2 to transmit on-cache information to the virtual tape device 40. For example, if an LV that is among LVs stored in the un-mounted PV and has been offloaded from the TVC 41 on the basis of the intra-PV LV off-cache priority logic exists, the requester 422 requests the host 1 or 2 to transmit on-cache information to the virtual tape device 40.

The receiver 423 receives the on-cache information from the host 1 or 2. The receiver 423 outputs the received on-cache information to the cache controller 424.

The cache controller 424 the functions of the cache controller 123 according to the first embodiment and the following function. That is, the cache controller 123 causes the LV that is among the LVs stored in the PV and has been specified in the on-cache information to be cached.

(Process Operations by Virtual Tape Device According to Fourth Embodiment)

Next, process operations that are executed by the virtual tape device 40 according to the fourth embodiment are described with reference to FIGS. 15A to 15D and 16. FIGS. 15A to 15D are diagrams describing process operations that are executed by the virtual tape device 40 according to the fourth embodiment when an available capacity of a PV is lower than the predetermined threshold. FIG. 16 is a diagram describing process operations that are executed by the virtual tape device 40 according to the fourth embodiment when the PV is un-mounted.

(Process Operations to be Executed when Available Capacity of PV is Lower Than Predetermined Threshold)

Figure 15A:
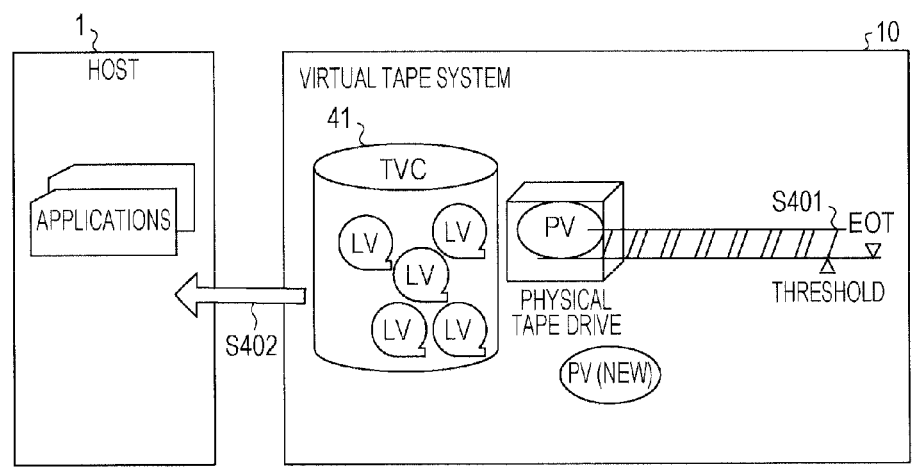
FIG. 15A is a diagram illustrating process operations to be executed by the virtual tape device according to the fourth embodiment when an available capacity of a PV is lower than a threshold.

FIGS. 15A to 15D illustrate an example in which the virtual tape system 10 receives a request to mount an LV from the host 1. As illustrated in FIG. 15A, in the virtual tape system 10, the threshold determining unit 421 determines that the available capacity of the mounted PV is lower than the threshold (in step S401). Then, the requester 422 notifies the host 1 that the available capacity of the PV is lower than the threshold, and the requester 422 requests the host 1 to transmit, to the virtual tape device 40, on-cache information that indicates an LV to be stored on the TVC 41 (in step S402).

Figure 15B:
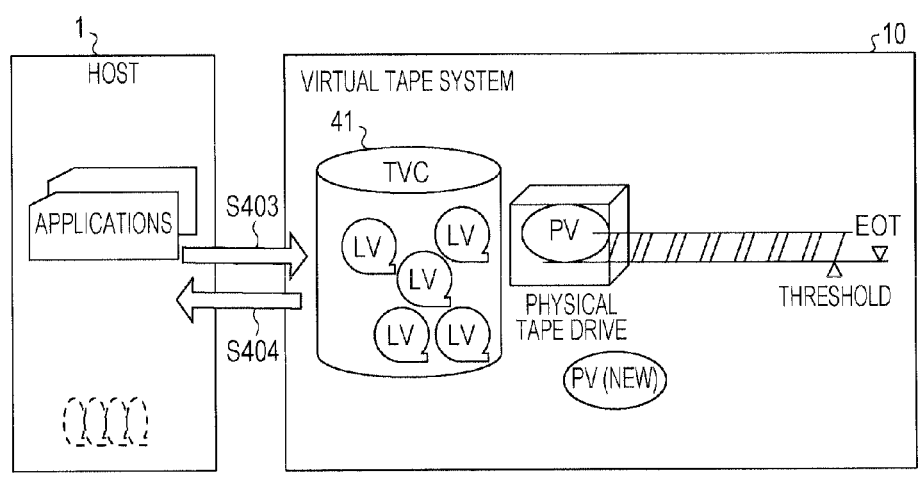
FIG. 15B is a diagram illustrating process operations to be executed by the virtual tape device according to the fourth embodiment when the available capacity of the PV is lower than the threshold.
Figure 16:
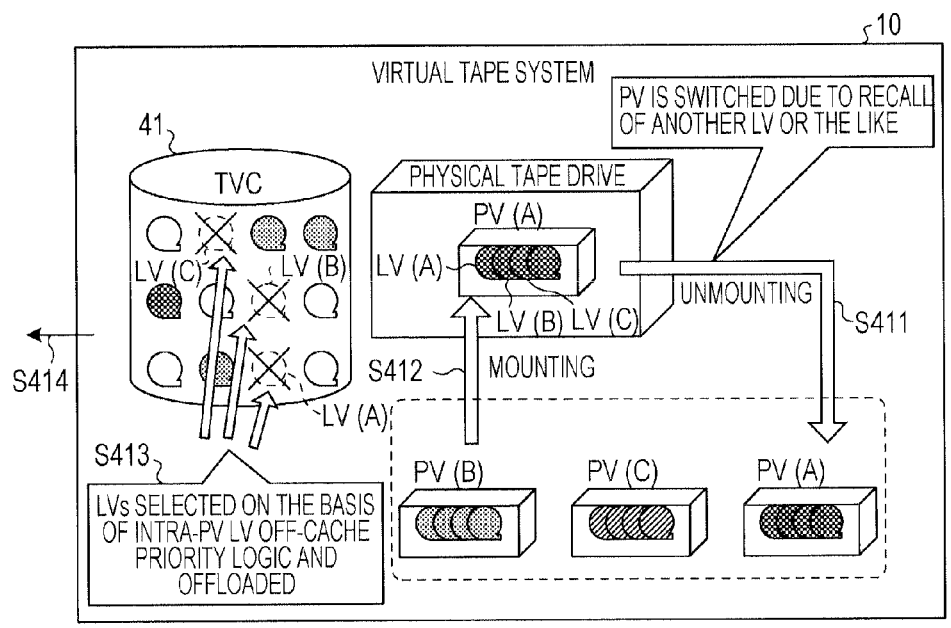
FIG. 16 is a diagram illustrating process operations to be executed by the virtual tape device according to the fourth embodiment when a PV is un-mounted.

Subsequently, as illustrated in FIG. 15B, the host 1 acquires information of the state of the virtual tape device 40 (in step S403). For example, the host 1 issues, to the virtual tape device 40, a command to acquire information of currently cached LVs and the state of data written to the PV and detects the state of the virtual tape device 40. Thus, the host 1 acquires the identifiers of the LVs stored on the TVC 41. Subsequently, the host 1 compares a list of LVs that are to be used while being cached with the LVs stored on the TVC 41 (in step S404).

Figure 15C:
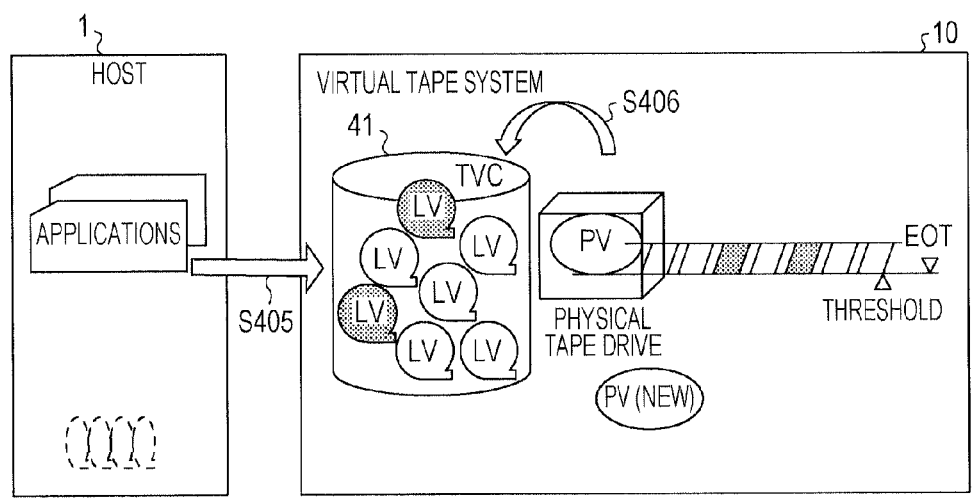
FIG. 15C is a diagram illustrating process operations to be executed by the virtual tape device according to the fourth embodiment when the available capacity of the PV is lower than the threshold.

Subsequently, as illustrated in FIG. 15C, the host 1 notifies the virtual tape device 40 of on-cache information that indicates an LV that is indicated in the list of the LVs that are to be used while being cached and is not currently stored on the TVC 41 (in step S405). Then, in the virtual tape device 40, the receiver 423 receives the on-cache information. Subsequently, the cache controller 424 causes the LV that is among LVs stored in the PV and specified in the on-cache information to be cached (in step S406).

Figure 15D:
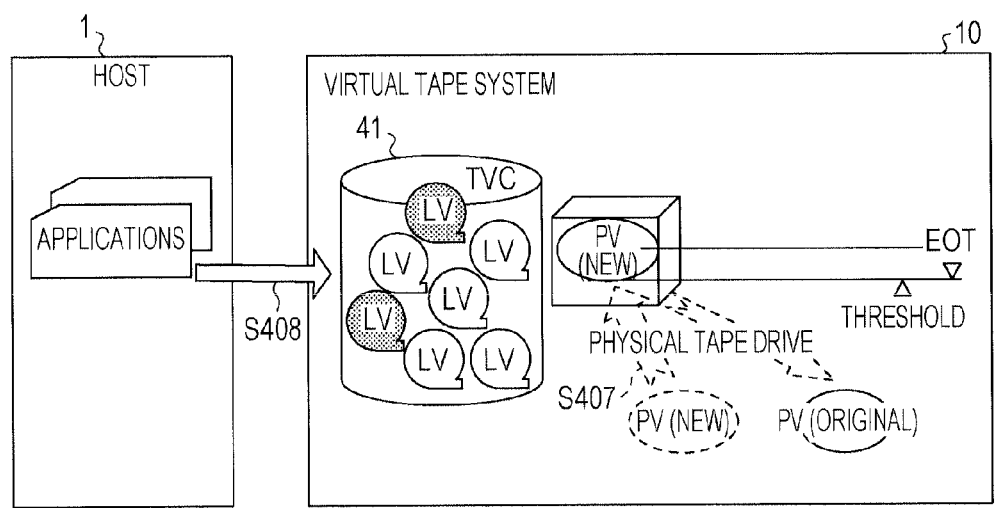
FIG. 15D is a diagram illustrating process operations to be executed by the virtual tape device according to the fourth embodiment when the available capacity of the PV is lower than the threshold.

After that, as illustrated in FIG. 15D, the PV is switched to another PV in the virtual tape system 10 (in step S407). Then, the host 1 accesses the LVs that are to be used while being cached (in step S408). Even when the PV is switched to the other PV, the LVs to be used are currently cached and the host 1 can continue to access the LVs to be used.

The host 1 may transmit, as the on-cache information to the virtual tape device 40, the list of the LVs that are to be used while being cached. In this case, the virtual tape device 40 determines whether or not the LVs specified in the on-cache information are cached. Then, the virtual tape device 40 recalls an LV that is not currently cached.

(Process Operations to be Executed when PV IS Un-Mounted)

As illustrated in FIG. 16, in the virtual tape system 10, the mounting controller 124 un-mounts the PV (A) storing the LV (A), the LV (B) and the LV (C) (in step S411). Subsequently, in the virtual tape system 10, the mounting controller 124 mounts the PV (B) (in step S412).

In the virtual tape system 10, the requester 422 determines that the LV (A), the LV (B) and the LV (C) have been offloaded from the TVC 41 (in step S413). Then, the requester 422 requests the host 1 or 2 to transmit on-cache information to the virtual tape device 40 (in step S414).

(Procedures for Processes by Virtual Tape Device According to Fourth Embodiment)

Figure 17:
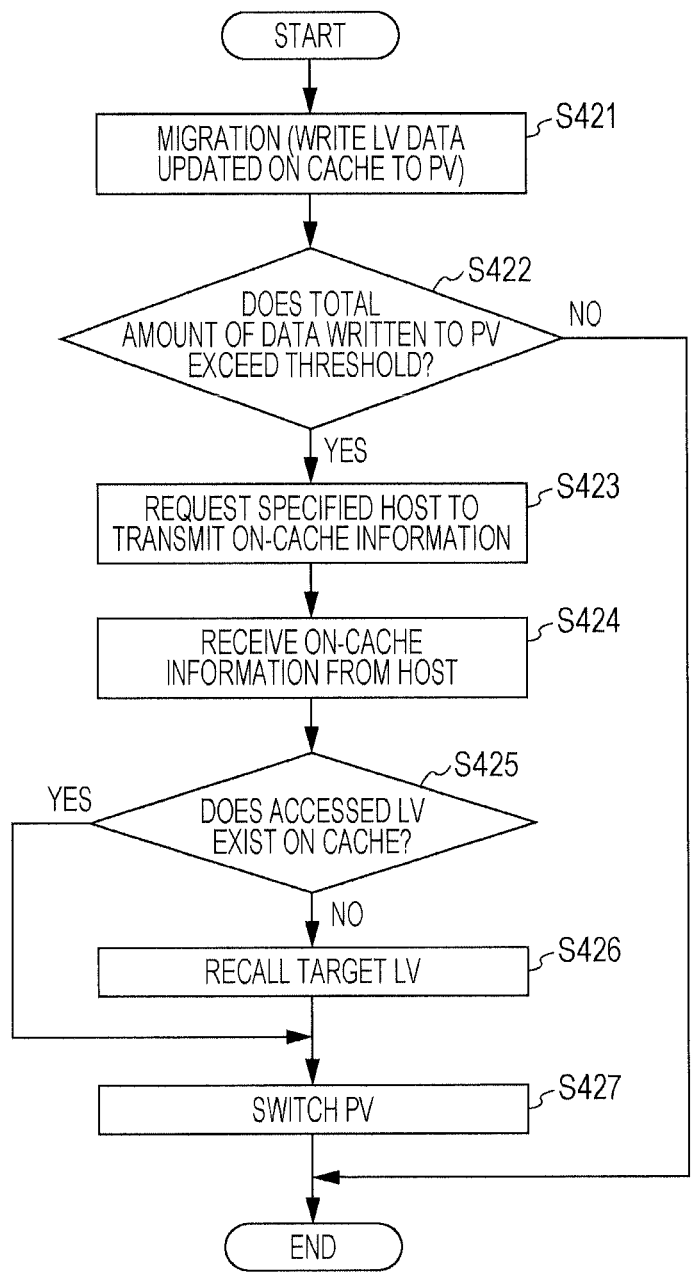
FIG. 17 is a method of procedures for a process that is executed by the virtual tape device according to the fourth embodiment when an available capacity of a PV is lower than the threshold.
Figure 18:
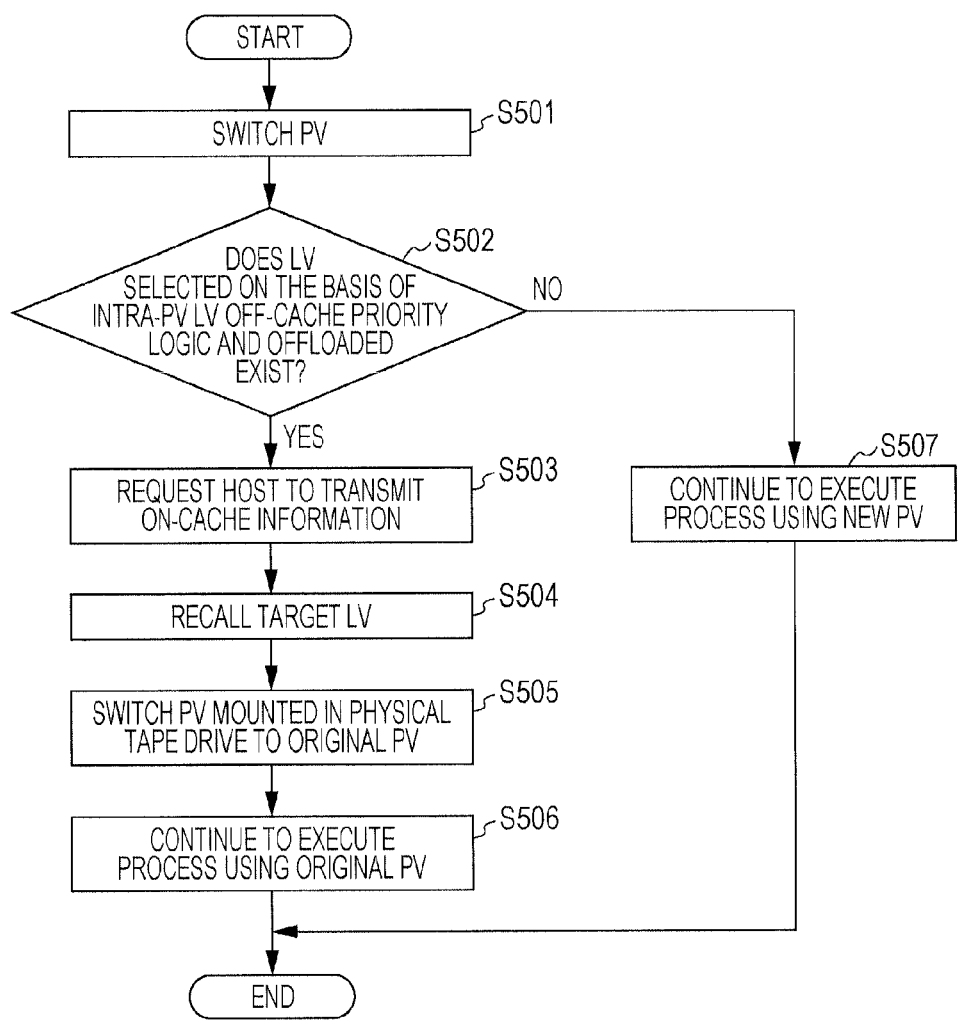
FIG. 18 is a method of procedures for a process that is executed by the virtual tape device according to the fourth embodiment when a PV is un-mounted.

Next, procedures for processes that are executed by the virtual tape device 40 according to the fourth embodiment are described with reference to FIGS. 17 and 18. FIG. 17 is a method of procedures for a process that is executed by the virtual tape device 40 when an available capacity of a PV is lower than the predetermined threshold. FIG. 18 is a method of procedures for a process that is executed by the virtual tape device 40 when the PV is un-mounted.

(Procedures for Process to be Executed when Available Capacity of PV is Lower than Predetermined Threshold)

When the virtual tape device 40 receives a migration request from the host 1 or 2, the virtual tape device 40 executes the following process. The following example assumes that the virtual tape device 40 determines whether or not an LV specified in on-cache information is cached and the virtual tape device 40 recalls an LV that is not currently cached. The migration request is a request to write an LV to a PV.

The mounting controller 124 writes an LV updated on the TVC 41 to a PV (in step S421). The threshold determining unit 421 determines whether or not an available capacity of the PV mounted in any of the physical tape drives is lower than the predetermined threshold (in step S422). If the threshold determining unit 421 determines that the available capacity of the PV mounted in any of the physical tape drives is not lower than the predetermined threshold (No in step S422), the process is terminated.

If the threshold determining unit 421 determines that the available capacity of the PV mounted in any of the physical tape drives is lower than the predetermined threshold (Yes in step S422), the requester 422 executes the following process. That is, the requester 422 requests the host 1 or 2 to transmit, to the virtual tape device 40, on-cache information that indicates an LV stored in the PV and to be stored on the TVC 41 (in step S423).

Subsequently, the receiver 423 receives the on-cache information from the host 1 or 2 (in step S424). The cache controller 424 determines whether or not the LV specified in the on-cache information is cached (in step S425). If the cache controller 424 determines that the LV specified in the on-cache information is cached (Yes in step S425), the process proceeds to step S427.

If the cache controller 424 determines that the LV specified in the on-cache information is not cached (No in step S425), the cache controller 424 causes the specified LV to be stored on the TVC 41 (in step S426). Subsequently, the mounting controller 124 switches the PV to another PV (in step S427). After the process of step S427 is terminated, the virtual tape device 40 terminates the process illustrated in FIG. 17.

(Procedures for Process to be Executed when PV is UnMounted)

When the virtual tape device 40 receives a request to unmount a PV from the host 1 or 2, the virtual tape device 40 executes the following process. As illustrated in FIG. 18, the mounting controller 124 switches the original PV to another PV (in step S501).

The requester 422 determines whether or not an LV that is among LVs stored in the un-mounted PV and has been selected on the basis of the intra-PV LV off-cache priority logic and offloaded from the TVC 41 exists (in step S502). If the requester 422 determines that the LV that is among the LVs stored in the un-mounted PV and has been selected on the basis of the intra-PV LV off-cache priority logic and offloaded from the TVC 41 does not exist (No in step S502), the process proceeds to S507.

If the requester 422 determines that the LV that is among the LVs stored in the un-mounted PV and has been selected on the basis of the intra-PV LV off-cache priority logic and offloaded from the TVC 41 exists (Yes in step S502), the requester 422 executes the following process. That is, the requester 422 requests the host 1 or 2 to transmit on-cache information to the virtual tape device 40 (in step S503).

Subsequently, the receiver 423 receives the on-cache information from the host 1 or 2. Then, the cache controller 424 recalls an LV specified in the on-cache information and causes the specified LV to be cached (in step S504). After the process of step S504, the mounting controller 124 switches the other PV mounted in the physical tape drive to the original PV (in step S505).

The virtual tape device 40 continues to execute the process using the original PV (in step S506). The virtual tape device 40 continues to execute the process using the other PV that has been switched (in step S507). After the processes of steps S506 and S507 are terminated, the virtual tape device 40 terminates the process illustrated in FIG. 18.

(Effects of Fourth Embodiment)

As described above, when a PV that is currently mounted in any of the physical tape drives is almost full of updated data of LVs, and the PV is to be switched, the virtual tape device 40 according to the fourth embodiment predicts the switching on the basis of the threshold table 411. Then, immediately before the PV becomes full of the data, the virtual tape device 40 requests the host 1 or 2 to transmit on-cache information to the virtual tape device 40. Then, the virtual tape device 40 caches an LV specified in the on-cache information. Thus, the LV is already cached upon the PV switching.

For example, the virtual tape device 40 according to the fourth embodiment interrupts the host 1 or 2 in order to switch a PV and recalls an LV with a high degree of importance during the time when a PV that stores the last updated data of the LV is mounted. As a result, the virtual tape device 40 according to the fourth embodiment can continue to execute the process while the superiority of the recall performance is maintained after the switching of the PV.

If an LV requested by the host 1 or 2 is not cached, the virtual tape device 40 according to the fourth embodiment issues an interrupt after switching of a PV and thereby provides a mounting instruction to cache the LV or preloads the LV. Thus, the PV that is once un-mounted is mounted in any of the physical tape drives. The virtual tape device 40 can continue to execute the process while the superiority of the recall performance is maintained after the switching of the PV.

The host 1 or 2 may use a preload function to cause a target LV to be cached and may cause a part of data of the target LV to be updated and thereby cause a time stamp of the target LV to be updated. The last updated data of the target LV and the newest time stamp are written to a PV by this process. In order to avoid writing useless data, only the time stamp may be updated and a command to reduce only an off-cache priority may be added. The time stamp of the cached LV is changed to the newest time stamp by this process. Thus, the LV is already cached upon switching of the PV. When the target LV is updated, the last updated data of the target LV is written to a newly mounted PV. Then, the process can be continuously executed on the LV stored in the PV.

Fifth Embodiment

The virtual tape device disclosed herein and the method disclosed herein for controlling the virtual tape device may be achieved in various different embodiments other than the aforementioned embodiments. The fifth embodiment describes other examples of the virtual tape device disclosed herein and the method disclosed herein for controlling the virtual tape device.

(Configuration of System and the Like)

All or a part of the processes that are described in the embodiments and automatically executed may be manually executed. All or a part of the processes that are described in the embodiments and manually executed may be automatically executed using known methods. The process procedures, control procedures and detailed names, which are described above or illustrated in the drawings, may be arbitrarily changed if not otherwise specified.

The information that is stored in the storage units illustrated is examples and may not be stored as illustrated in the drawings. The constituent parts illustrated are functionally conceptual parts and may not be physically configured as illustrated in the drawings. For example, in the VLP 46, the selector 122 and the cache controller 123 may be integrated with each other.

All or a part of the processing functions to be executed by the devices may be achieved by CPUs or programs to be analyzed and executed by the CPUs or may be achieved as hardware that is a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual tape device comprising:
   a storage unit that records logical volume information of a plurality of logical volumes, the logical volume information including, for each respective one of the plurality of logical volumes, an identifier of the respective logical volume, an updated time of the respective logical volume, information indicating whether the respective logical volume exists on a cache, an identifier of a respective physical volume storing data of the respective logical volume, and information indicating whether the respective physical volume is mounted in a physical tape drive;
   a cache determining unit that determines, based on the logical volume information, whether a requested logical volume exists on the cache when a request to store the requested logical volume on the cache is received and whether a logical volume, being updated and stored in the physical volume mounted in the physical tape drive, exists on the cache when the cache does not have available capacity;
   a selector that selects, based on the result of the determination made by the cache determining unit, the logical volume information, and a determination that the requested logical volume has been read into the cache from the physical volume at least a predetermined number of times, as a target logical volume to be offloaded from the cache, a logical volume of the plurality of logical volumes updated at an earliest time among logical volumes that exist on the cache; and
   a cache controller that offloads the target logical volume selected from the cache by the selector.

2. The virtual tape device according to claim 1,
   wherein when the cache determining unit determines that a plurality of logical volumes that have been updated and stored in the same physical volume mounted in the physical tape drive exist on the cache, the selector references the logical volume information and selects, as the target logical volume to be offloaded from the cache, the logical volume updated at the earliest time from among the plurality of logical volumes that exist on the cache.

3. The virtual tape device according to claim 2, further comprising
   a setting unit that sets a predefined time period in which offloading at least one of a plurality of target logical volumes to be offloaded from the cache is prohibited,
   wherein the selector determines whether the selected target logical volume to be offloaded from the cache is prohibited from being offloaded from the cache during the predefined time period, and selects another target logical volume when the selected target logical volume is prohibited from being offloaded from the cache.

4. The virtual tape device according to claim 1, further comprising:
   a read determining unit that determines whether the logical volume has been read onto the cache from the physical volume by a predefined number of times, while the physical volume is mounted from the physical tape drive.

5. The virtual tape device according to claim 1, further comprising:
   a threshold determining unit that determines whether an available capacity of the physical volume mounted in the physical tape drive is lower than a predefined threshold;
   a requesting unit that requests a host to transmit cache loading information indicating a logical volume to be cached on the cache and among logical volumes stored in the physical volume when the threshold determining unit determines that the available capacity of the physical volume is lower than the predefined threshold; and
   a receiving unit that receives the cache loading information from the host;
   wherein the cache controller causes the logical volume indicated in the cache loading information to be cached.

6. The virtual tape device according to claim 5, wherein when the physical volume is not mounted in the physical tape drive, the requesting unit requests the host to transmit the cache loading information to the virtual tape device.

7. A control method of a virtual tape device, comprising:
   causing the virtual tape device to read, from a storage unit, logical volume information of a plurality of logical volumes, the logical volume information including, for each respective one of the plurality of logical volumes, an identifier of the respective logical volume, an updated time of the respective logical volume, information indicating whether the respective logical volume exists on a cache, an identifier of a respective physical volume storing data of the respective logical volume, and information indicating whether the respective physical volume is mounted in a physical tape drive or not;

determining, based on the logical volume information, whether a requested logical volume exists on the cache when the virtual tape device receives a request to store the requested logical volume on the cache and whether a logical volume, being updated and stored in the physical volume mounted in the physical tape drive, exists on the cache when the cache does not have available capacity;

causing the virtual tape device to select, based on the result of the determination, the logical volume information, and a determination that the requested logical volume has been read onto the cache from the physical volume at least a predetermined number of times, as a target logical volume to be offloaded from the cache, a logical volume of the plurality of logical volumes updated at an earliest time among logical volumes that exist on the cache; and causing the virtual tape device to offload the selected target logical volume from the cache.

* * * * *